(12) United States Patent
Yamamoto et al.

(10) Patent No.: US 10,374,225 B2
(45) Date of Patent: Aug. 6, 2019

(54) NON-AQUEOUS ELECTROLYTE SECONDARY BATTERY

(71) Applicant: Nissan Motor Co., Ltd., Yokohama-shi, Kanagawa (JP)

(72) Inventors: Kensuke Yamamoto, Kanagawa (JP); Wataru Ogihara, Kanagawa (JP); Gentaro Kano, Kanagawa (JP); Hideaki Tanaka, Kanagawa (JP); Youichirou Kondou, Kanagawa (JP); Masaaki Suzuki, Kanagawa (JP); Tsuyoshi Tanabe, Kanagawa (JP); Takashi Nakano, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/096,377

(22) PCT Filed: Apr. 28, 2016

(86) PCT No.: PCT/JP2016/063492
§ 371 (c)(1),
(2) Date: Oct. 25, 2018

(87) PCT Pub. No.: WO2017/187638
PCT Pub. Date: Nov. 2, 2017

(65) Prior Publication Data
US 2019/0140261 A1    May 9, 2019

(51) Int. Cl.
| | | |
|---|---|---|
| *H01M 2/16* | (2006.01) | |
| *H01M 4/36* | (2006.01) | |
| *H01M 4/38* | (2006.01) | |
| *H01M 4/587* | (2010.01) | |
| *H01M 4/505* | (2010.01) | |
| *H01M 4/525* | (2010.01) | |
| *H01M 2/02* | (2006.01) | |
| *H01M 4/62* | (2006.01) | |
| *H01M 10/0525* | (2010.01) | |
| *H01M 4/02* | (2006.01) | |

(52) U.S. Cl.
CPC ......... *H01M 4/364* (2013.01); *H01M 2/0285* (2013.01); *H01M 2/0287* (2013.01); *H01M 2/1686* (2013.01); *H01M 4/386* (2013.01); *H01M 4/505* (2013.01); *H01M 4/525* (2013.01); *H01M 4/587* (2013.01); *H01M 4/622* (2013.01); *H01M 10/0525* (2013.01); *H01M 2004/021* (2013.01)

(58) Field of Classification Search
CPC ...... H01M 4/364; H01M 4/505; H01M 4/525; H01M 4/587; H01M 4/622; H01M 2/0285; H01M 2/0287; H01M 2/1686; H01M 10/052; H01M 10/0525; H01M 2004/021

See application file for complete search history.

(56) References Cited

U.S. PATENT DOCUMENTS

| | | | |
|---|---|---|---|
| 2007/0128517 A1 | 6/2007 | Christensen et al. | |
| 2009/0061319 A1* | 3/2009 | Kim | H01M 4/366 429/220 |
| 2011/0003209 A1 | 1/2011 | Katayama et al. | |
| 2013/0224600 A1* | 8/2013 | Yasuda | H01G 11/50 429/231.8 |
| 2015/0044570 A1* | 2/2015 | Kim | H01M 4/386 429/231.8 |
| 2015/0303455 A1 | 10/2015 | Watanabe et al. | |
| 2016/0141600 A1* | 5/2016 | Furuya | H01M 4/366 429/231.8 |
| 2017/0012316 A1 | 1/2017 | Ogihara et al. | |

FOREIGN PATENT DOCUMENTS

| | | |
|---|---|---|
| JP | 2009517850 A | 4/2009 |
| JP | 20147120 A | 1/2014 |
| JP | 201482139 A | 5/2014 |
| KR | 20110002889 A | 1/2011 |
| KR | 20150074098 A | 7/2015 |
| WO | 2015111187 A1 | 7/2015 |
| WO | 2015146864 A1 | 10/2015 |

* cited by examiner

*Primary Examiner* — Raymond Alejandro
(74) *Attorney, Agent, or Firm* — Young Basile Hanlon & MacFarlane, P.C.

(57) ABSTRACT

A non-aqueous electrolyte secondary battery includes: a negative electrode active material represented by the Formula (1)=α (Si material)+β (carbon material), wherein the Si material is one or more kinds selected from the group consisting of $SiO_x$ that is a mixture of amorphous $SiO_2$ particles and Si particles and a Si-containing alloy; α and β represent % by mass of each component in the layer; and $80 \leq \alpha+\beta \leq 98$, $0.1 \leq \alpha \leq 40$, and $58 \leq \beta \leq 97.9$ are satisfied, and a difference between the maximum value and the minimum value of an area proportion (%) of a binder in an area of the field of view of each image of cross-sections of the layer in a case where a plurality of arbitrary places is selected in a plane of the negative electrode active material layer is within 10%.

7 Claims, 5 Drawing Sheets

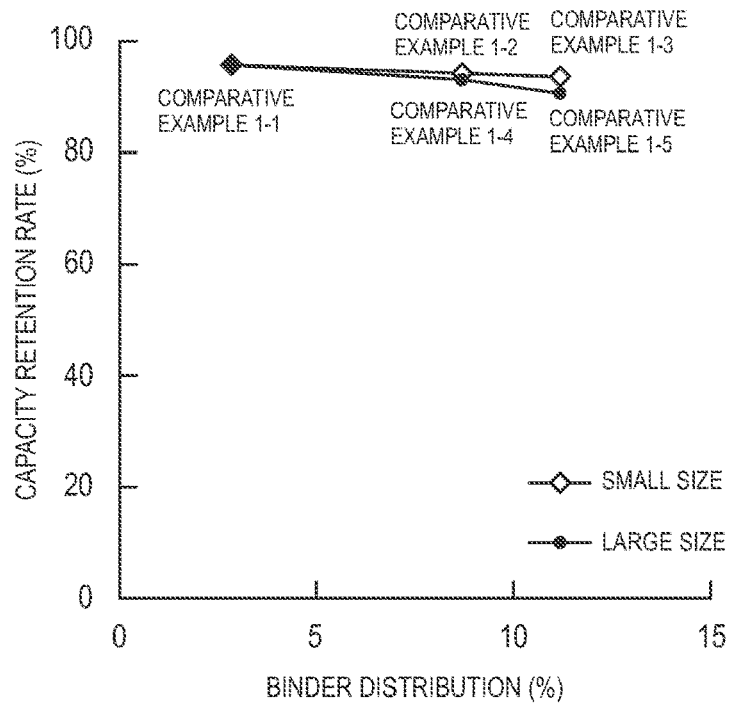
FIG.4 MIXING RATIO OF Si MATERIAL: 0% BY MASS
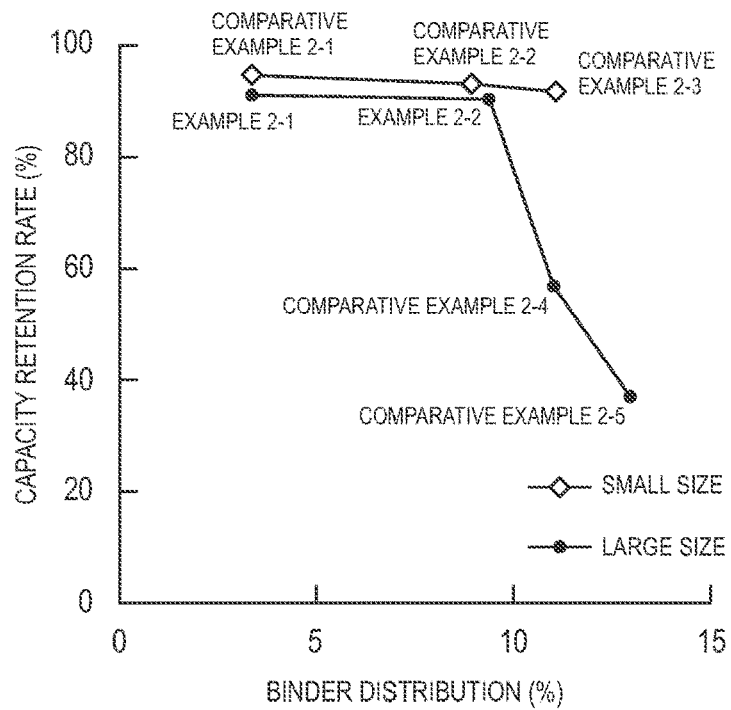
FIG.5 MIXING RATIO OF Si MATERIAL: 10% BY MASS

NON-AQUEOUS ELECTROLYTE SECONDARY BATTERY

TECHNICAL FIELD

The present invention relates to a non-aqueous electrolyte secondary battery. The non-aqueous electrolyte secondary battery according to the present invention is used in a power source or auxiliary power source for driving motors of vehicles such as electric vehicles, fuel cell vehicles, and hybrid electric vehicles.

BACKGROUND

In recent years, it has been desired to reduce the amount of carbon dioxide in order to cope with global warming. Hence, a non-aqueous electrolyte secondary battery having a small environmental burden has been used not only in a mobile device or the like but also in a power source device of an electrically driven vehicle such as a hybrid vehicle (HEV), an electric vehicle (EV), or a fuel cell vehicle. A lithium ion secondary battery directed to the application to electrically driven vehicles is desired to have a large capacity and a large area.

Hitherto, a carbon material such as graphite, which is advantageous in terms of charge and discharge cycle lifetime or cost, has been used for a negative electrode of a lithium ion secondary battery. However, the carbon material has a disadvantage that a theoretical charge and discharge capacity of 372 mAh/g or more, which is obtained from $LiC_6$ as a compound introduced with maximum amount of lithium, cannot be obtained since the battery is charged and discharged by absorbing lithium ions into graphite crystals and desorbing the lithium ions therefrom in the negative electrode active material using the carbon material such as graphite. Thus, by using only the negative electrode active material using the carbon material such as graphite, it is difficult to obtain a capacity and energy density that are high enough to satisfy vehicle use on the practical level.

On the other hand, a battery using a material which is alloyed with Li in the negative electrode active material has improved energy density as compared with a battery using a carbon material such as graphite of the related art, and thus such a material is expected to be used as a material of the negative electrode active material for vehicle use. For example, a Si material absorbs and desorbs 3.75 mol of lithium ion per mol in charging and discharging and has a theoretical capacity of 3600 mAh/g in $Li_{15}Si_4$ (=$Li_{3.75}Si$).

However, a lithium ion secondary battery using the material which is alloyed with Li in the negative electrode, particularly, using the Si material has large expansion-shrinkage in the negative electrode at the time of charging and discharging. For example, volumetric expansion of a graphite material in the case of absorbing Li ions is about 1.2 times. However, the Si material has a problem of a decrease in cycle lifetime of the electrode due to a large volumetric change of about 4 times, which is caused by transition from an amorphous state to a crystal state when Si is alloyed with Li. In addition, in the case of a Si negative electrode active material, the capacity has a trade-off relationship with cycle durability. Thus, there has been a problem in that it is difficult to increase the capacity and improve the cycle durability concurrently.

In order to solve the problems described above, for example, a negative electrode active material which contains an amorphous alloy having a composition represented by formula: $Si_xM_yAl_z$, for a lithium ion secondary battery is proposed (for example, see JP 2009-517850 A). Herein, in the formula, x, y, and z represent an atomic percentage value, x+y+z=100, x≥55, y<22, and z>0 are satisfied, and M represents a metal formed of at least one kind of Mn, Mo, Nb, W, Ta, Fe, Cu, Ti, V, Cr, Ni, Co, Zr, and Y. In the invention described in JP 2009-517850 A, it is stated in paragraph [0018] that, by minimizing a content of the metal M, not only a high capacity but also good cycle lifetime is exhibited. In addition, it is stated that, by mixing a graphite material having small expansion, good cycle lifetime is exhibited.

SUMMARY

According to the studies of the present inventors, it is found that sufficient charge and discharge cycle characteristics are not achieved in the case of a battery having a large capacity and a large area even by the technique described in JP 2009-517850 A. Further, it is found that such a decrease in charge and discharge cycle characteristics is caused by a plurality of negative electrode active materials each having a different theoretical charge and discharge capacity being contained in the negative electrode active material layer, that is, is caused by containing a carbon material such as graphite, which is an already-known negative electrode active material, and a silicon material having a higher capacity than the carbon material. Further, non-uniformity of the binder, which is caused by containing a plurality of negative electrode active materials, for example, a carbon material and a silicon material, per unit area in each structural level of the electrode and the battery is exponentially and significantly exhibited as the capacity and area of the battery are increased. As a result, it is found that, as the result of local current concentration in a plane of the negative electrode, sites each having a different degradation degree are generated in a plane of the negative electrode so that charge and discharge cycle characteristics are degraded.

That is, in a case where sites having a large amount of the binder and sites having a small amount of the binder exist in a plane of the negative electrode of a non-aqueous electrolyte secondary battery having a large capacity and a large area, the expansion of the electrode becomes larger since the binding property in the inside of the electrode is small in the sites having a small amount of the binder. On the other hand, the expansion of the electrode becomes smaller since the binding property in the inside of the electrode is large in the sites having a large amount of the binder. In sites in which the expansion of the electrode is large, an interelectrode distance between a positive electrode and a negative electrode becomes shorter, and in sites in which the expansion of the electrode is small, the interelectrode distance between the positive electrode and the negative electrode becomes longer. Reaction is accelerated in sites in which the interelectrode distance is short since resistance becomes smaller and the current becomes larger, and reaction is difficult to proceed in sites in which the interelectrode distance is long since resistance becomes larger and the amount of current becomes smaller. That is, non-uniformity of the reaction occurs in a plane of the negative electrode. In particular, in sites in which the amount of reaction is large, acceleration of the side reaction with an electrolyte solution and acceleration of degradation of the active material occur, and thus the cycle durability of the battery is significantly degraded. Further, since the binding property is small in the sites having a small amount of the binder, desorption of the active material, or the like occurs in the process of charging and discharging, and according to this, the cycle durability is degraded.

In this regard, an object of the present invention is to provide a means for achieving sufficient charge and discharge cycle characteristics in a non-aqueous electrolyte secondary battery having a large capacity and a large area even when a mixture of a high-capacity Si material and a carbon material having small expansion are used as an active material of a negative electrode.

The present inventors have conducted intensive studies in order to solve the above-described problem. As a result, it has been found that the above-described problem is solved by using a ratio of a battery volume to a rated capacity and the rated capacity as an index indicating a large-sized battery having a large capacity and a large area, setting these in a predetermined range, and controlling a variation in dispersibility of a binder in a negative electrode active material layer to a value in a predetermined range, thereby completing the present invention.

That is, the present invention provides a non-aqueous electrolyte secondary battery, which contains a mixture of a small amount of Si material and a large amount of carbon material as a negative electrode active material and has a variation in dispersibility of a binder in a negative electrode active material layer within 10%, in a large-sized battery in which a rated capacity is 3 Ah or more and a ratio of a battery volume to the capacity is 10 cm$^3$/Ah or less.

According to the present invention, by setting the variation in dispersibility of the binder in the negative electrode active material layer within 10%, in the large-sized battery, a variation in amount of expansion at the time of charging in a plane of the negative electrode is decreased. According to this, a phenomenon that non-uniformity of reactivity with Li ions is caused by an interelectrode distance between a positive electrode and a negative electrode being increased in a certain site and being decreased in a certain site is suppressed, and the cycle durability of a battery is improved. In addition, by setting the variation in dispersibility of the binder in the negative electrode active material layer within 10%, in the large-sized battery, sites in which the binder in the negative electrode active material layer is not sufficient are decreased. According to this, it is possible to prevent the active material from dropping off and to improve the cycle durability of the battery.

BRIEF DESCRIPTION OF THE DRAWINGS

FIG. 4 is a diagram illustrating a relation between binder distribution and a capacity retention rate while batteries are divided into a small-sized battery and a large-sized battery in Comparative Examples 1-1 to 1-5 (a mixing ratio of a Si material is 0% by mass);

FIG. 5 is a diagram illustrating a relation between binder distribution and a capacity retention rate while batteries are divided into a small-sized battery and a large-sized battery in Examples 2-1 and 2-2 and Comparative Examples 2-1 to 2-5 (a mixing ratio of a Si material is 10% by mass)

DETAILED DESCRIPTION

Figure 1:
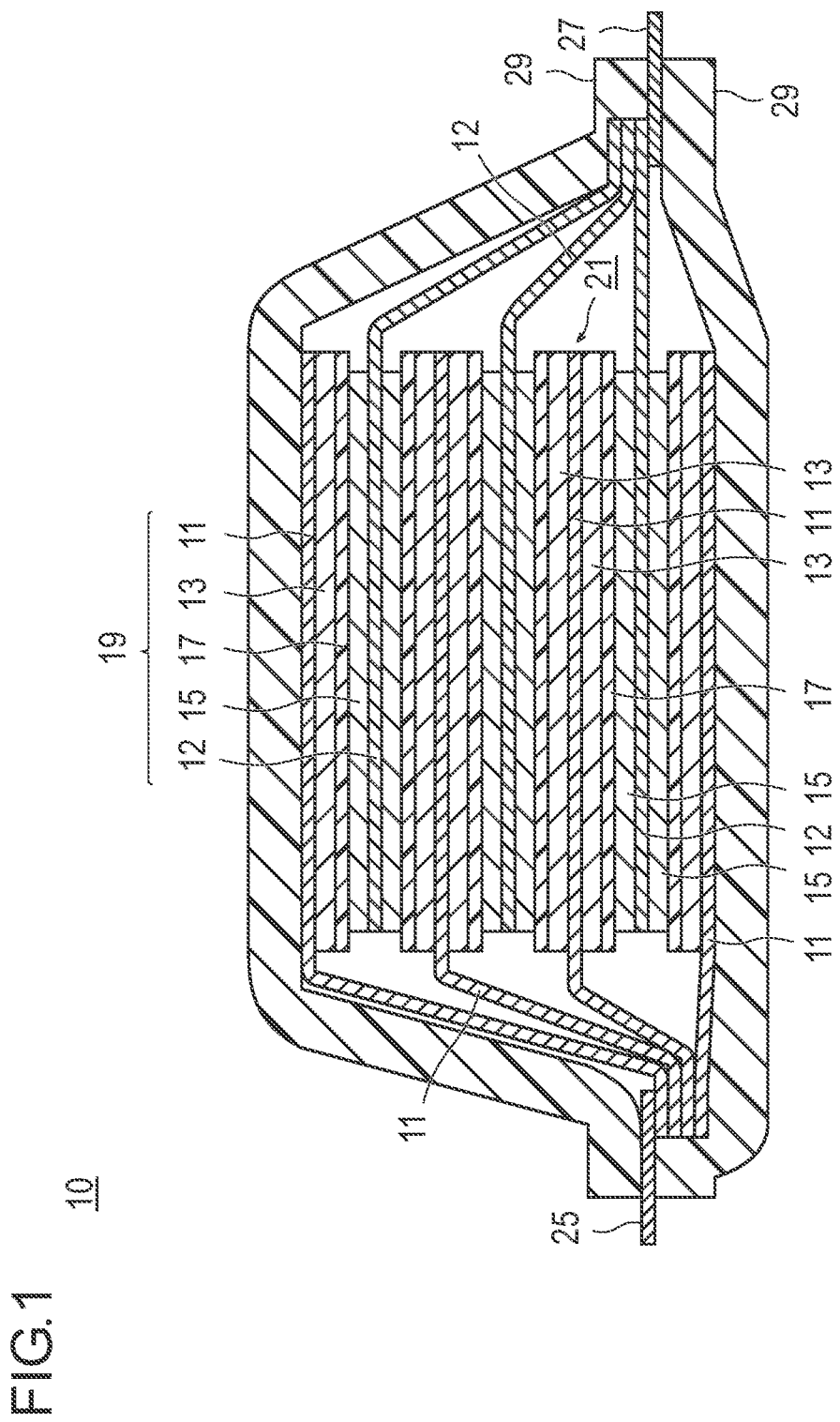
FIG. 1 is a schematic cross-sectional view illustrating a basic configuration of a flat type (laminate type) lithium ion secondary battery, which is not a bipolar type, as an embodiment of a non-aqueous electrolyte secondary battery according to the present invention.

According to an aspect of the present invention, provided is a non-aqueous electrolyte secondary battery which has a ratio value of a battery volume (a product of a projected area and a thickness of the battery including a battery outer casing body) to a rated capacity of 10 cm$^3$/Ah or less and a rated capacity of 3 Ah or more, the battery including:

a power generating element including a positive electrode comprising a positive electrode active material layer containing a positive electrode active material formed on a surface of a positive electrode current collector, a negative electrode comprising a negative electrode active material layer containing a negative electrode active material formed on a surface of a negative electrode current collector, and a separator, in which the negative electrode active material layer contains a negative electrode active material represented by the following Formula (1):

[Mathematical Formula 1]

$$\alpha(\text{Si material}) + \beta(\text{carbon material}) \quad (1)$$

(in the formula, the Si material is one or two or more kinds selected from the group consisting of $SiO_x$ that is a mixture of amorphous $SiO_2$ particles and Si particles (x represents the number of oxygen atoms satisfying an atomic valence of Si) and a Si-containing alloy; the carbon material is one or two or more kinds selected from the group consisting of graphite, non-graphitizable carbon, and amorphous carbon, $\alpha$ and $\beta$ represent % by mass of each component in the negative electrode active material layer; and $80 \leq \alpha + \beta \leq 98$, $0.1 \leq \alpha \leq 40$, and $58 \leq \beta \leq 97.9$ are satisfied), and a difference between the maximum value and the minimum value of an area proportion (%) of a binder in an area of the field of view of each image of cross-sections of the negative electrode active material layer in a case where a plurality of arbitrary places is selected in a plane of the negative electrode active material layer is within 10%. With such a configuration, the effect of the invention can be effectively exhibited.

Hereinafter, a basic configuration of the non-aqueous electrolyte secondary battery according to the present invention will be described. In the present embodiment, descriptions are given by exemplifying a lithium ion secondary battery.

First, in the lithium ion secondary battery of the present embodiment, a voltage of a cell (single battery layer) is large, and high energy density and high output density can be achieved. Therefore, the lithium ion secondary battery of the present embodiment is excellent for a power source or auxiliary power source for driving a vehicle. As a result, the lithium ion secondary battery of the present embodiment can be suitably used as a lithium ion secondary battery for a driving power source and the like for a vehicle. In addition, the lithium ion secondary battery of the present embodiment can be sufficiently applied to a lithium ion secondary battery for a mobile device such as a mobile phone.

In a case where the lithium ion secondary battery is classified in terms of a shape and a structure, for example, the lithium ion secondary battery may be applicable to any batteries having known shapes and structures such as a laminate type (flat) battery and a wound type (cylindrical) battery. The structure of the laminate type (flat) battery contributes to ensuring long-term reliability by a simple sealing technique such as simple thermocompression bonding, and thus has the advantage in terms of cost and workability.

Further, in terms of electrical connection (electrode structure) inside the lithium ion secondary battery, the lithium ion secondary battery may be applicable not only to a non-bipolar type (internal parallel connection type) battery but also to a bipolar type (internal serial connection type) battery.

In a case where the lithium ion secondary battery is classified in terms of the type of an electrolyte layer used therein, the lithium ion secondary battery may be applicable to batteries including various types of known electrolyte layers such as a solution electrolyte type battery in which a solution electrolyte such as a non-aqueous electrolyte solution is used for an electrolyte layer and a polymer battery in which a polymer electrolyte is used for an electrolyte layer. The polymer battery is classified into a gel electrolyte type battery using a polymer gel electrolyte (also simply referred to as a gel electrolyte) and a solid polymer (all solid state) type battery using a polymer solid electrolyte (also simply referred to as a polymer electrolyte).

Therefore, in the following descriptions, as an example of the lithium ion secondary battery of the present embodiment, a non-bipolar (internal parallel connection type) lithium ion secondary battery will be described briefly with reference to the drawings. However, the technical scope of an electrical device according to the present invention and the lithium ion secondary battery according to the present embodiment should not be limited to the following descriptions.

<Overall Structure of Battery>

FIG. 1 is a schematic cross-sectional view schematically illustrating the overall structure of a flat (laminate type) lithium ion secondary battery (hereinafter, also simply referred to as a "laminate type battery") which is a representative embodiment of the non-aqueous electrolyte secondary battery of the present invention.

As illustrated in FIG. 1, a laminate type battery 10 of the present embodiment has a structure in which a substantially rectangular power generating element 21, in which a charging and discharging reaction actually progresses, is sealed inside a laminate sheet 29 as an outer casing body. Herein, the power generating element 21 has a configuration in which a positive electrode having a positive electrode active material layer 15 provided on both surfaces of a positive electrode current collector 12, electrolyte layers 17, and a negative electrode having a negative electrode active material layer 13 provided on both surfaces of a negative electrode current collector 11. Specifically, the negative electrode, the electrolyte layer, and the positive electrode are laminated in this order such that one positive electrode active material layer 15 faces the negative electrode active material layer 13 adjacent thereto with the electrolyte layer 17 interposed therebetween.

Accordingly, the positive electrode, the electrolyte layer, and the negative electrode that are adjacent to one another constitute one single battery layer 19. Thus, it can also be said that the laminate type battery 10 illustrated in FIG. 1 has a configuration in which a plurality of the single battery layers 19 is laminated so as to be electrically connected in parallel. Meanwhile, although the outermost negative electrode current collector located on both outermost layers of the power generating element 21 is provided with the negative electrode active material layer 13 only on one side thereof, the outermost negative electrode current collector may be provided with the active material layer on both sides thereof. That is, it is not limited to a current collector having an active material layer formed only on one surface to be used exclusively for the outermost layer, and a current collector provided with the active material layers on both sides thereof may be also used by itself. Further, it is also possible that, by reversing the arrangement of the positive electrode and the negative electrode illustrated in FIG. 1, the outermost positive electrode current collector is located on both outermost layers of the power generating element 21 and the positive electrode active material layer is arranged on a single side or both sides of the outermost positive electrode current collector.

A positive electrode current collecting plate 27 and a negative electrode current collecting plate 25 which are electrically conductive to the respective electrodes (the positive electrodes and the negative electrodes) are attached to the positive electrode current collector 12 and the negative electrode current collector 11, respectively. The positive electrode current collecting plate 27 and the negative electrode current collecting plate 25 are held by being inserted between the respective end portions of the laminate sheet 29 and exposed to the outside of the laminate sheet 29. The positive electrode current collecting plate 27 and the negative electrode current collecting plate 25 may be attached to the positive electrode current collector 12 and the negative electrode current collector 11 of the respective electrodes via a positive electrode lead and a negative electrode lead (not illustrated) as necessary by ultrasonic welding, resistance welding, or the like.

Hereinafter, main constituent members of the battery will be described.

<Active Material Layer>

The active material layer (13, 15) contains an active material, and further contains another additive as necessary.

[Positive Electrode Active Material Layer]

The positive electrode active material layer 15 contains a positive electrode active material. In the present embodiment, the positive electrode active material is not particularly limited; however, lithium nickel-based composite oxide or spinel type lithium manganese composite oxide is preferably contained and lithium nickel-based composite oxide is more preferably contained. Incidentally, the ratio of the total amount of lithium nickel-based composite oxide and spinel type lithium manganese composite oxide with respective to the whole amount of 100% by mass of the positive electrode active material contained in the positive electrode active material layer is preferably 50% by mass or more, more preferably 70% by mass or more, further preferably 85% by mass or more, even more preferably 90% by mass or more, particularly preferably 95% by mass or more, and most preferably 100% by mass.

Lithium Nickel-Based Composite Oxide

The lithium nickel-based composite oxide is not specifically limited in terms of the composition as long as it is a composite oxide containing lithium and nickel. Representative examples of the composite oxide containing lithium and nickel include a lithium nickel composite oxide ($LiNiO_2$). However, a composite oxide in which a part of nickel atoms of the lithium nickel composite oxide is replaced with another metal atom is more preferable. As a preferable example, a lithium-nickel-manganese-cobalt composite oxide (hereinafter, also simply referred to as "NMC composite oxide") has a layered crystal structure in which a lithium atom layer and a transition metal (Mn, Ni, and Co are arranged with regularity) atom layer are alternately stacked via an oxygen atom layer, one Li atom is included per atom of transition metal M and an amount of extractable Li is twice the amount of spinel type lithium manganese composite oxide, that is, as the supply power is two times higher, it can have a high capacity. In addition, as having higher heat stability compared to $LiNiO_2$, it is particularly advantageous among the nickel-based composite oxides that are used as a positive electrode active material.

In this specification, the NMC composite oxide also includes a composite oxide in which a part of transition metal elements is replaced with another metal element. In this case, examples of another element include Ti, Zr, Nb, W, P, Al, Mg, V, Ca, Sr, Cr, Fe, B, Ga, In, Si, Mo, Y, Sn, V, Cu, Ag, and Zn. Ti, Zr, Nb, W, P, Al, Mg, V, Ca, Sr, and Cr are preferable, Ti, Zr, P, Al, Mg, and Cr are more preferable, and from the viewpoint of improving the cycle characteristics, Ti, Zr, Al, Mg, and Cr are further preferable.

By having a high theoretical discharge capacity, the NMC composite oxide preferably has a composition represented by the General Formula (1): $Li_aNi_bMn_cCo_dM_xO_2$ (provided that, in the formula, a, b, c, d, and x satisfy $0.9 \leq a \leq 1.2$, $0<b<1$, $0<c \leq 0.5$, $0<d \leq 0.5$, $0 \leq x \leq 0.3$, and $b+c+d=1$; and M represents at least one element selected from Ti, Zr, Nb, W, P, Al, Mg, V, Ca, Sr, and Cr). Herein, a represents the atomic ratio of Li, b represents the atomic ratio of Ni, c represents the atomic ratio of Mn, d represents the atomic ratio of Co, and x represents the atomic ratio of M. From the viewpoint of the cycle characteristics, it is preferable that $0.4 \leq b \leq 0.6$ is satisfied in the General Formula (1). Incidentally, composition of each element can be measured, for example, by induction coupled plasma (ICP) spectroscopy.

In general, from the viewpoint of improving purity and improving electron conductivity of a material, nickel (Ni), cobalt (Co) and manganese (Mn) are known to contribute to capacity and output characteristics. Ti or the like replaces a part of transition metal in a crystal lattice. From the viewpoint of the cycle characteristics, it is preferable that a part of transition element is replaced by another metal element, and it is particularly preferable that $0<x \leq 0.3$ is satisfied in the General Formula (1). It is considered that the crystal structure is stabilized by dissolving at least one selected from the group consisting of Ti, Zr, Nb, W, P, Al, Mg, V, Ca, Sr, and Cr so that a decrease in capacity of a battery can be prevented even after repeated charge and discharge, and thus, excellent cycle characteristics can be achieved.

As a more preferable embodiment, it is preferable that b, c, and d in the General Formula (1) satisfy $0.44 \leq b \leq 0.51$, $0.27 \leq c \leq 0.31$, and $0.19 \leq d \leq 0.26$ from the viewpoint of having excellent balance between capacity and durability.

The lithium nickel-based composite oxide such as the NMC composite oxide can be produced by selecting various known methods such as a co-precipitation method and a spray drying method. From the viewpoint of having easy production of the composite oxide according to the present embodiment, a co-precipitation method is preferably used. Specifically, as a method for synthesizing the NMC composite oxide, production can be made by, for example, a method described in JP 2011-105588 A, in which a nickel-cobalt-manganese composite oxide is produced by the co-precipitation method and the nickel-cobalt-manganese composite oxide is mixed with a lithium compound followed by calcination. Hereinafter, specific descriptions will be given.

Raw material compounds of a composite oxide, for example, a Ni compound, a Mn compound, and a Co compound, are dissolved in a suitable solvent such as water so as to have a desired composition of a material of the active material. Examples of the Ni compound, the Mn compound, and the Co compound include sulfate, nitrate, carbonate, acetate, oxalate, oxide, hydroxide, and halide of the metal element. Specific examples of the Ni compound, the Mn compound, and the Co compound include nickel sulfate, cobalt sulfate, manganese sulfate, nickel acetate, cobalt acetate, and manganese acetate, but not limited thereto. During the process, a compound containing at least one metal element such as Ti, Zr, Nb, W, P, Al, Mg, V, Ca, Sr, and Cr as a metal element for replacing a part of the layered lithium metal composite oxide constituting the active material may be further incorporated in order to have a further desired composition of an active material, if necessary.

A co-precipitation reaction can be performed by neutralization and precipitation reactions using the above raw material compounds and an alkali solution. Accordingly, metal composite hydroxide or metal composite carbonate containing the metal included in the above raw material compounds can be obtained. Examples of the alkali solution which can be used include an aqueous solution of sodium hydroxide, potassium hydroxide, sodium carbonate, or ammonia. For the neutralization reaction, it is preferable to use sodium hydroxide, sodium carbonate, or a mixture solution thereof. In addition, it is preferable to use an aqueous ammonia solution or ammonia salt for complex reaction.

The adding amount of the alkali solution used for the neutralization reaction is sufficient to have an equivalent ratio of 1.0 to components to be neutralized which are contained in the whole metal salts. However, for pH adjustment, the alkali solution is preferably added together with an amount of excess alkali.

The aqueous ammonia solution or ammonia salt used for a complex reaction is preferably added such that the ammonia concentration in the reaction solution is in a range of 0.01 to 2.00 mol/l. The pH of the reaction solution is preferably controlled in a range of 10.0 to 13.0. Further, the reaction temperature is preferably 30° C. or higher and more preferably 30 to 60° C.

The composite hydroxide obtained by co-precipitation reaction is then preferably filtered by suction, washed with water, and dried. Incidentally, by controlling the conditions for performing the co-precipitation reaction (for example, stirring time and alkali concentration), the particle diameter of the composite hydroxide can be controlled, and it has an influence on the average particle diameter (D50 (A)) of the secondary particles of a positive electrode active material which is finally obtained.

Subsequently, by mixing and calcining nickel-cobalt-manganese composite hydroxide with a lithium compound, the lithium-nickel-manganese-cobalt composite oxide can be obtained. Examples of the Li compound include lithium hydroxide or a hydrate thereof, lithium peroxide, lithium nitrate, and lithium carbonate.

The calcination treatment may be performed by one step, but is preferably performed by two steps (temporary calcination and main calcination). According to the two-step calcination, a composite oxide can be obtained efficiently. The conditions for the temporary calcination are not particularly limited, and the conditions may vary depending on the lithium raw material, and thus are difficult to unambiguously define. Herein, as factors for controlling the average primary particle diameter and the crystallite diameter in particular, the calcination temperature and the calcination time for calcination (temporary calcination and main calcination in the case of the two-step calcination) are particularly important. By controlling them on the basis of the tendency as described below, the average primary particle diameter and the crystallite diameter can be controlled. That is, the average primary particle diameter and the crystallite diameter are increased by lengthening the calcination time, and the average primary particle diameter and the crystallite diameter are increased by increasing the calcination temperature. Incidentally, the temperature increase rate is preferably 1 to 20° C./min from room temperature. Further, the atmosphere is preferably either air or oxygen atmosphere. Herein, in a case where the NMC composite oxide is synthesized using lithium carbonate as the Li raw material, the temporary calcination temperature is preferably 500 to 900° C., more preferably 600 to 800° C., and further preferably 650 to 750° C. Furthermore, the temporary calcination time is preferably 0.5 to 10 hours and more preferably 4 to 6 hours. Meanwhile, as for the conditions for main calcination, the temperature increase rate is preferably 1 to 20° C./min from room temperature, although it is not particularly limited thereto. Furthermore, the atmosphere is preferably either air or oxygen atmosphere. Herein, in a case where the NMC composite oxide is synthesized using lithium carbonate as the Li raw material, the calcination temperature is preferably 800 to 1200° C., more preferably 850 to 1100° C., and further preferably 900 to 1050° C. Further, the main calcination time is preferably 1 to 20 hours and more preferably 8 to 12 hours.

In a case where a tiny amount of a metal element for replacing a part of the layered lithium metal composite oxide constituting a material of the active material is added as necessary, any means such as a method of mixing the metal element in advance with nickel, cobalt, and manganate, a method of adding the metal element simultaneously with nickel, cobalt, manganate, a method of adding the metal element to a reaction solution during the reaction, or a method of adding the metal element to the nickel-cobalt-manganese composite oxide with a Li compound can be employed as the adding method.

The lithium nickel-based composite oxide can be produced by suitably adjusting the reaction conditions such as pH of a reaction solution, a reaction temperature, a reaction concentration, an addition speed, and a stirring time.

Spinel Type Lithium Manganese Composite Oxide

The spinel type lithium manganese composite oxide typically has a composition of $LiMn_2O_4$, and is a composite oxide which has a spinel structure and essentially contains lithium and manganese. As for the specific configuration or production method, reference can be suitably made to the conventionally known knowledge that is described in JP 2000-77071 A or the like.

Incidentally, it is needless to say that a positive electrode active material other than the lithium nickel-based composite oxide or the spinel type lithium manganese composite oxide described above may be used. When two or more kinds of the positive electrode active materials are used concurrently, in a case where the respective active materials have different particle diameters in order to achieve their own peculiar effects, different particle diameters may be blended together so as to optimally function to achieve their own peculiar effects, and thus it is not necessary to uniformize the particle diameter of all of the active materials.

The average particle diameter of the positive electrode active material contained in the positive electrode active material layer 15 is not particularly limited; however, from the viewpoint of having high output, the average particle diameter is preferably 6 to 11 μm and more preferably 7 to 10 μm in terms of the secondary particle diameter. Further, the average particle diameter of the primary particle is 0.4 to 0.65 μm and more preferably 0.45 to 0.55 μm. Incidentally, the term "particle diameter" described in this specification means a maximum distance L among distances, each of which is a distance between arbitrary two points on outlines of a particle. Further, as for the value of the "average particle diameter," a value which is calculated as an average value of particle diameters of particles observed in several to several tens of visual fields by using an observing means such as a scanning electron microscope (SEM) or a transmission electron microscope (TEM).

Further, the positive electrode active material layer preferably contains a binder and a conductive aid in addition to the aforementioned positive electrode active material. Moreover, as necessary, other additives such as an electrolyte (such as a polymer matrix, an ion conductive polymer, or an electrolyte solution) and a lithium salt for enhancing ion conductivity are further contained.

The content of the positive electrode active material which may function as the active material in the positive electrode active material layer is preferably 85 to 99.5% by mass.

(Binder)

The binder used for the positive electrode active material layer is not particularly limited, and for example, the following materials are exemplified: thermoplastic polymers such as polyethylene, polypropylene, polyethylene terephthalate (PET), polyether nitrile, polyacrylonitrile, polyimide, polyamide, cellulose, carboxymethyl cellulose (CMC) and a salt thereof, an ethylene-vinyl acetate copolymer, polyvinyl chloride, styrene-butadiene rubber (SBR), isoprene rubber, butadiene rubber, ethylene-propylene rubber, an ethylene-propylene-diene copolymer, a styrene-butadiene-styrene block copolymer and a hydrogenated product thereof, and a styrene-isoprene-styrene block copolymer and a hydrogenated product thereof; fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF); vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based fluorine rubber (VDF-PFMVE-TFE-based fluorine rubber), and vinylidene fluoride-chlorotrifluoroethylene-based fluorine rubber (VDF-CTFE-based fluorine rubber); and an epoxy resin. These binders may be used singly or two or more kinds thereof may be used concurrently.

The content of the binder in the positive electrode active material layer is preferably 1 to 10% by mass and more preferably 1 to 8% by mass.

(Conductive Aid)

The conductive aid is an additive to be blended for improving conductivity of the positive electrode active material layer or the negative electrode active material layer. Examples of the conductive aid include carbon black such as acetylene black, Ketjen black, or furnace black, carbon powder such as channel black, thermal black, or graphite, various carbon fibers such as vapor-grown carbon fiber (VGCF; registered trademark), and a carbon material such as expanded graphite. When the active material layer contains the conductive aid, the electron network in the inside of the active material layer is effectively formed, thereby contributing to the improvement of output characteristics of a battery.

The content of the conductive aid in the positive electrode active material layer is preferably 1 to 10% by mass and more preferably 1 to 8% by mass. When the blending ratio (content) of the conductive aid is defined in the above range, the following effects are exhibited. That is, as the electron conductivity is sufficiently ensured without inhibiting an electrode reaction, a decrease in energy density caused by decreased electrode density can be suppressed, and also an improvement in energy density based on improvement in electrode density can be obtained.

(Other Components)

Examples of an electrolyte salt (lithium salt) include $Li(C_2F_5SO_2)_2N$, $LiPF_6$, $LiBF_4$, $LiClO_4$, $LiAsF_6$, $LiCF_3SO_3$ and the like.

Examples of the ion conductive polymer include a polyethylene oxide (PEO)-based polymer and a polypropylene oxide (PPO)-based polymer.

The blending ratio of the component contained in the positive electrode active material layer is not particularly limited. The blending ratio may be adjusted while reference can be suitably made to the conventionally known knowledge about a lithium ion secondary battery.

The positive electrode (positive electrode active material layer) can be formed by an ordinary method of applying (coating) a slurry, or by any of a kneading method, a sputtering method, a vapor deposition method, a CVD method, a PVD method, an ion plating method, and a thermal spraying method.

[Negative Electrode Active Material Layer]

The negative electrode active material layer 13 is characterized by containing a negative electrode active material represented by the following Formula (1):

[Mathematical Formula 2]

$$\alpha(\text{Si material}) + \beta(\text{carbon material}) \quad (1)$$

(In the formula, the Si material is one or two or more kinds selected from the group consisting of $SiO_x$ that is a mixture of amorphous $SiO_2$ particles and Si particles (x represents the number of oxygen atoms satisfying an atomic valence of Si) and a Si-containing alloy; the carbon material is one or two or more kinds selected from the group consisting of graphite, non-graphitizable carbon, and amorphous carbon, $\alpha$ and $\beta$ represent % by mass of each component in the negative electrode active material layer; and $80 \leq \alpha + \beta \leq 98$, $0.1 \leq \alpha \leq 40$, and $58 \leq \beta \leq 97.9$ are satisfied).

That is, the negative electrode active material layer 13 essentially contains a material selected from the group consisting of $SiO_x$ and a Si-containing alloy (these are also collectively referred to as "Si material") as the negative electrode active material, and the carbon material.

In this specification, the Si material means $SiO_x$ that is a mixture of amorphous $SiO_2$ particles and Si particles (x represents the number of oxygen atoms satisfying an atomic valence of Si) and a Si-containing alloy. These may be used singly as the Si material or two or more kinds thereof may be used concurrently. Hereinafter, these Si materials will be described in detail.

($SiO_x$)

$SiO_x$ is a mixture of amorphous $SiO_2$ particles and Si particles, and x represents the number of oxygen atoms satisfying an atomic valence of Si. A specific value of x is not particularly limited, but can be set appropriately.

Further, the above $SiO_x$ may be conductive $SiO_x$ particles obtained by coating surfaces of $SiO_x$ particles with a conductive material by a mechanical surface fusion treatment. By such a configuration, Si in $SiO_x$ particles desorbs or inserts a lithium ion easily, and a reaction in the active material can proceed more smoothly. In this case, the content of the conductive material in the conductive $SiO_x$ particles is preferably 1 to 30% by mass and more preferably 2 to 20% by mass.

Method for Producing $SiO_x$

A method for producing $SiO_x$ according to the present embodiment is not particularly limited, and $SiO_x$ can be produced using various conventionally known production methods. That is, there is little difference in an amorphous state and characteristics between production methods, and thus any production method can be applied.

Examples of a method for preparing $SiO_x$ include the following methods. First, Si powder and $SiO_2$ powder as raw materials are blended at a predetermined ratio, and the powders are mixed, granulated, and dried to obtain a mixed granulated raw material. The mixed granulated raw material is heated in an inert gas atmosphere (830° C. or higher) or heated in a vacuum (1,100° C. or higher and 1,600° C. or lower) to generate (sublimate) SiO. The gaseous SiO generated by sublimation is vapor-deposited on a precipitation substrate (the temperature of the substrate is 450° C. or higher and 800° C. or lower) to precipitate a SiO precipitate. Thereafter, the SiO precipitate is removed from the precipitation substrate, and is ground using a ball mill or the like to obtain $SiO_x$ powder.

A value of x can be determined by fluorescent X-ray analysis. For example, a value of x can be determined by using a fundamental parameter method in fluorescent X-ray analysis using an O—Kα ray. In the fluorescent X-ray analysis, for example, RIX3000 manufactured by Rigaku Denki Kogyo Co., Ltd. can be used. As conditions for the fluorescent X-ray analysis, for example, rhodium (Rh) may be used as a target, and a tube voltage to 50 kV and a tube current to 50 mA may be applied. A value of x obtained here is calculated using the intensity of the O—Kα ray detected in a measurement region on the substrate, and therefore is an average value in the measurement region.

(Si-Containing Alloy)

The Si-containing alloy is not particularly limited as long as it is an alloy with other metal containing Si, and reference can be suitably made to the conventionally known knowledge. Herein, preferred embodiments of the Si-containing alloy include $Si_xTi_yGe_zA_a$, $Si_xTi_yZn_zA_a$, $Si_xTi_ySn_zA_a$, $Si_xSn_yAl_zA_a$, $Si_xSn_yV_zA_a$, $Si_xSn_yC_zA_a$, $Si_xZn_yV_zA_a$, $Si_xZn_ySn_zA_a$, $Si_xZn_yAl_zA_a$, $Si_xZn_yC_zA_a$, $Si_xAl_yC_zA_a$, and $Si_xAl_yN_bA_a$ (in the formula, A represents an inevitable impurity; and x, y, z, and a represent values of % by mass and satisfy the conditions of $0 < x < 100$, $0 < y < 100$, $0 \leq z < 100$, $0 \leq a < 0.5$, and x+y+z+a=100). More preferably, a Si-containing alloy further satisfying 0<z<100 in the above formula is exemplified. By using those Si-containing alloys as the negative electrode active material and suitably selecting a predetermined first addition element and a predetermined second addition element, amorphous-crystal phase transition at the time of the alloying with Li can be suppressed so that the cycle lifetime can be improved. In addition, according to this, the negative electrode active material thus obtained has a higher capacity than conventional negative electrode active materials such as carbon-based negative electrode active materials.

It is sufficient that the average particle diameter of $SiO_x$ or the Si-containing alloy as the Si material is at the same level as the average particle diameter of the negative electrode active material contained in the negative electrode active material layer 13 of the related art, and it is not particularly limited. From the viewpoint of having high output, preferably, D50 of the secondary particle diameter is in a range of 1 to 20 μm. In addition, preferably, D90 of the secondary particle diameter is in a range of 5 to 100 μm. Herein, as the secondary particle diameter of the Si material, a value obtained by a laser diffraction method is used. However, it is never limited to the above range, and it is needless to say that it can be outside the above range as long as the working effect of this embodiment can be effectively exhibited. Furthermore, the shape of the Si material is not particularly limited, and may be a spherical, elliptical, cylindrical, polygonal, scale-like, or amorphous shape.

Method for Producing Si-Containing Alloy

A method for producing a Si-containing alloy according to the present embodiment is not particularly limited, and the Si-containing alloy can be produced by using various conventionally known production methods. As an example of the method for producing a Si-containing alloy, the following production method is exemplified, but the method for producing a Si-containing alloy is not limited thereto.

First, a step of mixing raw materials of the Si-containing alloy to obtain a mixed powder is performed. In this step, the raw materials of the alloy are mixed in consideration of the composition of the Si-containing alloy to be obtained. As the raw materials of the alloy, the form and the like thereof are not particularly limited as long as the ratio of elements required as the Si-containing alloy can be realized. For example, it is possible to use one obtained by mixing simple substances of elements constituting the Si-containing alloy at a target ratio or an alloy, a solid solution, or an intermetallic compound having a target element ratio. In addition, raw materials in a powder form are usually mixed. According to this, a mixed powder composed of raw materials is obtained.

Subsequently, the mixed powder obtained above is subjected to an alloying treatment. According to this, a Si-containing alloy that can be used as a negative electrode active material for a non-aqueous electrolyte secondary battery is obtained.

As a method for the alloying treatment, there are a solid phase method, a liquid phase method, and a vapor phase method, and examples thereof include a mechanical alloying method, an arc plasma melting method, a casting method, a gas atomizing method, a liquid quenching method, an ion beam sputtering method, a vacuum deposition method, a plating method, and a vapor phase chemical reaction method. Among them, it is preferable to perform the alloying treatment by using the mechanical alloying method. It is preferable to perform the alloying treatment by using the mechanical alloying method since it is possible to easily control the state of the phase. In addition, a step of melting the raw materials or a step of quenching and solidifying the molten material may be included before the alloying treatment.

By performing the aforementioned alloying treatment, a structure composed of a parent phase/a silicide phase can be formed. In particular, when the time for the alloying treatment is 12 hours or longer, a non-aqueous electrolyte secondary battery capable of exerting desired cycle durability can be obtained. Incidentally, the time for the alloying treatment is preferably 24 hours or longer, more preferably 30 hours or longer, further preferably 36 hours or longer, still more preferably 42 hours or longer, and particularly preferably 48 hours or longer. Incidentally, the upper limit of the time for the alloying treatment is not particularly limited, but may be usually 72 hours or shorter.

The alloying treatment by the method described above is usually performed in a dry atmosphere, but the particle size distribution after the alloying treatment has a wide width from a small size to a large size in some cases. For this reason, it is preferable to perform a crushing treatment and/or a classification treatment to adjust the particle size.

The particle diameter can be controlled by appropriately performing a treatment such as classification or pulverization to particles obtained by the alloying treatment. Examples of a classification method include wind classification, a mesh filtration method, and a sedimentation method. In addition, the pulverization condition is not particularly limited, but the pulverization time, the rotational speed, and the like by an appropriate pulverizer (for example, an apparatus which can be used also in the mechanical alloying method such as a planetary ball mill) may be appropriately set. As an example of the pulverization condition, an example in which the pulverization is performed using a pulverizer such as planetary ball mill at a rotational speed of 200 to 400 rpm for 30 minutes to 4 hours.

Further, the negative electrode active material layer can be formed by applying a negative electrode active material slurry containing a negative electrode active material, a binder, a conductive aid, a solvent, and the like to a current collector, but a pulverization treatment may be further performed when the negative electrode active material slurry is prepared. A pulverization means is not particularly limited, but a known means can be appropriately employed. The pulverization condition is not particularly limited, but the pulverization time, the rotational speed, and the like may be appropriately set. As an example of the pulverization condition, an example in which the pulverization is performed using a pulverizer such as planetary ball mill at a rotational speed of 200 to 400 rpm for 30 minutes to 4 hours. Further, the pulverization treatment may be performed in plural time with a cooling period sandwiched therebetween in order to prevent the solvent from being altered by heating due to the pulverization treatment.

(Carbon Material)

The carbon material which may be used in the present invention is one or two or more materials selected from the group consisting of graphite, non-graphitizable carbon, and amorphous carbon. Specifically, the carbon material is one or two or more materials selected from the group consisting of graphite, which is high crystalline carbon, such as natural graphite or artificial graphite; non-graphitizable carbon such as hard carbon; and amorphous carbon like carbon black such as Ketjen black, acetylene black, channel black, lamp black, oil furnace black, or thermal black. Among these, graphite such as natural graphite or artificial graphite is preferably used.

In this embodiment, when the carbon material is used as the negative electrode active material in combination with the Si material, a high initial capacity can be obtained while higher cycle characteristics and rate characteristics are maintained, and thus balanced properties can be exhibited.

The Si material such as $SiO_x$ and a Si-containing alloy is not uniformly disposed in the negative electrode active material layer in some cases. In such a case, the potentials or the capacities exhibited by $SiO_x$ or the Si-containing alloy is different from one another. As a result, in $SiO_x$ or the Si-containing alloy in the negative electrode active material layer, $SiO_x$ or the Si-containing alloy that reacts with a lithium ion excessively and $SiO_x$ or the Si-containing alloy that does not react with a lithium ion are generated. That is, non-uniformity of a reaction of $SiO_x$ or the Si-containing alloy in the negative electrode active material layer with a lithium ion is generated. An excessive action of $SiO_x$ or the Si-containing alloy that reacts with a lithium ion excessively among the above-described alloys may thereby cause decomposition of an electrolytic solution due to a significant reaction with the electrolytic solution or destruction of the structure of $SiO_x$ or the Si-containing alloy due to excessive expansion. As a result, even in a case where $SiO_x$ or the Si-containing alloy having excellent characteristics is used, for example, when the $SiO_x$ or the Si-containing alloy is not disposed uniformly, cycle characteristics as a negative electrode for a non-aqueous electrolyte secondary battery may be deteriorated.

However, when the $SiO_x$ or the Si-containing alloy is mixed with the carbon material, the above-described problems can be solved. More specifically, when $SiO_x$ or the Si-containing alloy is mixed with the carbon material, it is possible to uniformly dispose $SiO_x$ or the Si-containing alloy in the negative electrode active material layer. As a result, it is considered that any of $SiO_x$ or the Si-containing alloy in the negative electrode active material layer exhibits a similar reactivity, and deterioration of cycle characteristics can be prevented.

Incidentally, as a result of mixing the carbon material, the content of $SiO_x$ or the Si-containing alloy in the negative electrode active material layer is reduced, and thus the initial capacity may be reduced. However, since the carbon material itself has a reactivity with a lithium ion, the degree of reduction in the initial capacity is relatively small. That is, the negative electrode active material according to this embodiment has a larger effect for improving cycle characteristics than the action for the reduction of the initial capacity.

Further, the carbon material hardly changes in volume during a reaction with a lithium ion compared with $SiO_x$ or the Si-containing alloy. Therefore, even in a case where the change of $SiO_x$ or the Si-containing alloy in volume is large, an influence by the change of the negative electrode active material in volume in accordance with a lithium reaction can be relatively small when the negative electrode active material is seen as a whole. Such an effect can be understood also from the results of Examples that a larger content of the carbon material (smaller content of the Si material) makes cycle characteristics higher.

Further, when the carbon material is contained, a consumed electric quantity (Wh) can be improved. More specifically, the carbon material has a relatively lower potential than $SiO_x$. As a result, the relatively high potential of the Si material can be reduced. The potential of the entire negative electrode is thereby reduced, and therefore the consumed electric quantity (Wh) can be improved. Such an action is particularly advantageous, for example, in use for vehicles.

The shape of the carbon material is not particularly limited, and may be a spherical, elliptical, cylindrical, polygonal, scale-like, or amorphous shape.

Further, the average particle diameter of the carbon material is not particularly limited, but D50 of the secondary particle diameter is preferably 5 to 50 μm and more preferably 5 to 25 μm. Herein, as the secondary particle diameter of the carbon material, a value obtained by a laser diffraction method is used. At this time, compared to the average particle diameter of the aforementioned Si material, the average particle diameter of the carbon material may be the same or different from the average particle diameter of the Si material, but is preferably different from that of the Si material. The average particle diameter of the Si material is more preferably smaller than the average particle diameter of the carbon material. A ratio (A/C) of D50 (A) of the secondary particle diameter of the Si material to D50 (C) of the secondary particle diameter of the carbon material is preferably less than 0.5, more preferably 0.3 or less, and further preferably 0.1 or less. When D50 (C) of the secondary particle diameter of the carbon material is relatively larger than D50 (A) of the secondary particle diameter of the Si material, it is possible to have a configuration in which particles of the carbon material are uniformly arranged and the Si material is disposed between the particles of the carbon material, and thus the Si material can be uniformly arranged in the negative electrode active material layer. In addition, in a case where the particle diameter of the Si material having a relatively large capacity is the same as the particle diameter of the carbon material having a small capacity, a variation in capacity distribution in a plane of the negative electrode active material layer easily occurs even when the particles are uniformly dispersed apparently. Therefore, by decreasing the particle diameter of the Si material having a relatively large capacity, it is possible to reduce a variation in capacity distribution in a plane of the negative electrode active material layer. The lower limit of A/C is not particularly limited, and for example, is 0.01 or more.

A negative electrode active material other than the above-described two types of the negative electrode active material may be used concurrently according to circumstances. Examples of the negative electrode active material which can be used concurrently include a lithium-transition metal composite oxide (for example, $Li_4Ti_5O_{12}$), a metal material, and a lithium alloy-based negative electrode material. It is needless to say that a negative electrode active material other than those can also be used.

The negative electrode active material layer contains a negative electrode active material represented by the following Formula (1).

[Mathematical Formula 3]

$$\alpha(\text{Si material}) + \beta(\text{carbon material}) \qquad (1)$$

In the Formula (1), the Si material is one or two or more kinds selected from the group consisting of $SiO_x$ that is a mixture of amorphous $SiO_2$ particles and Si particles (x represents the number of oxygen atoms satisfying an atomic valence of Si) and a Si-containing alloy. The carbon material is one or two or more kinds selected from the group consisting of graphite, non-graphitizable carbon, and amorphous carbon as described above. In addition, α and β (represent % by mass of each component in the negative electrode active material layer, and $80 \leq \alpha+\beta \leq 98$, $0.1 \leq \alpha \leq 40$, and $58 \leq \beta \leq 97.9$ are satisfied.

As it is evident from the Formula (1), the content (α) of the Si material in the negative electrode active material layer is 0.1 to 40% by mass. In addition, the content (β) of the carbon material is 58 to 97.9% by mass. Moreover, the total content (α+β) of these materials is 80 to 98% by mass.

Incidentally, the mixing ratio of the Si material and the carbon material of the negative electrode active material is not particularly limited as long as it satisfies the content requirement described above, and it can be suitably selected depending on desired use or the like. In this embodiment, regarding the mixing ratio of the Si material and the carbon material, when the content of the Si material is set to be relatively small and the content of the carbon material is set to be relatively large, the working effect of this embodiment can be effectively exhibited. In particular, the content (α) of the Si material in the negative electrode active material is in a range of preferably 0.5 to 40% by mass, more preferably 1 to 30% by mass, and further preferably 1 to 20% by mass. When the content of the Si material in the negative electrode active material layer is less than 0.1% by mass, a high initial capacity is difficult to obtain. On the other hand, when the content of the Si material is more than 40% by mass, high cycle characteristics are not obtained. Further, the content (β) of the carbon material in the negative electrode active material is in a range of preferably 58 to 97.5% by mass, more preferably 68 to 97% by mass, and further preferably 78 to 97% by mass. When the content of the carbon material in the negative electrode active material is less than 58% by mass, high cycle characteristics is not obtained. On the other hand, when the content of the carbon material in the negative electrode active material is more than 97.9% by mass, a high initial capacity is difficult to obtain.

The content (α+β) of the Si material and the carbon material in the negative electrode active material layer is not particularly limited as long as it satisfies the content requirement described above, and it can be suitably selected depending on desired use or the like. In particular, the content (α+β) of the Si material and the carbon material in the negative electrode active material layer is in a range of preferably 80 to 98% by mass, more preferably 85 to 97% by mass, and further preferably 90 to 97% by mass. When the content of the Si material and the carbon material in the negative electrode active material layer is less than 80% by mass, weight energy density is decreased, which is not preferable. On the other hand, when the content of the Si material and the carbon material is more than 98% by mass, the binder and the conductive aid are not sufficient and this causes degradation in battery performance, which is not preferable.

(Binder)

In the present embodiment, the negative electrode active material layer essentially contains a binder. As the binder contained in the negative electrode active material layer, an aqueous binder is preferably contained. Regarding the aqueous binder, procurement of water as a raw material is easy and also only water vapor is generated during drying, and thus there is an advantage that the investment on facilities of a production line can be greatly cut down and a decrease in environmental burden can be achieved.

The aqueous binder refers to a binder which contains water as a solvent or a dispersion medium, and specific examples thereof include a thermoplastic resin, a polymer exhibiting rubber elasticity, a water-soluble polymer, and any mixture thereof. Herein, the binder which contains water as a dispersion medium includes all which are regarded as latex or an emulsion, and it refers to a polymer that is emulsified in water or suspended in water. Examples thereof include a polymer latex obtained by emulsion polymerization in a self-emulsifying system.

Specific examples of the aqueous binder include a styrene polymer (styrene-butadiene rubber (SBR), a styrene-vinyl acetate copolymer, a styrene-acrylic copolymer, or the like), acrylonitrile-butadiene rubber, methyl methacrylate-butadiene rubber, (meth)acrylic polymer (polyethyl acrylate, polyethyl methacrylate, polypropyl acrylate, polymethyl methacrylate (methyl methacrylate rubber), polypropyl methacrylate, polyisopropyl acrylate, polyisopropyl methacrylate, polybutyl acrylate, polybutyl methacrylate, polyhexyl acrylate, polyhexyl methacrylate, polyethylhexyl acrylate, polyethylhexyl methacrylate, polylauryl acrylate, polylauryl methacrylate, or the like), polytetrafluoroethylene, polyethylene, polypropylene, an ethylene-propylene copolymer, polybutadiene, butyl rubber, fluorine rubber, polyethylene oxide, polyepichlorohydrin, polyphosphagen, polyacrylonitrile, polystyrene, an ethylene-propylene-diene copolymer, polyvinylpyridine, chlorosulfonated polyethylene, a polyester resin, a phenolic resin, and an epoxy resin. These aqueous binders may be used singly or two or more kinds thereof may be used concurrently.

From the viewpoint of binding property, the aqueous binder preferably contains at least one rubber-based binder selected from the group consisting of styrene-butadiene rubber (SBR), acrylonitrile-butadiene rubber, methyl methacrylate-butadiene rubber, and methyl methacrylate rubber. Further, the aqueous binder preferably contains styrene-butadiene rubber (SBR) since the binding property thereof is favorable.

In the case of using the aqueous binder, a thickener is preferably used concurrently. The aqueous binder has strong binding property (binding effect) but does not have sufficient thickening property. Therefore, a sufficient thickening effect is not obtained only by adding the aqueous binder to an aqueous slurry at the time of producing the electrode. In this regard, by using a thickener having excellent thickening property, thickening property is imparted to the aqueous binder. The thickener is not particularly limited, and examples thereof include polyvinyl alcohol (the average polymerization degree is suitably 200 to 4000 and more suitably 1000 to 3000, and the saponification degree is suitably 80% by mol or more and more suitably 90% by mol or more) and a modified product thereof (a product obtained by saponifying 1 to 80% by mol of the vinyl acetate units in a copolymer of ethylene/vinyl acetate=(2/98) to (30/70) molar ratio, a product obtained by partially acetalizing 1 to 50% by mol of polyvinyl alcohol, or the like), starch and a modified product thereof (oxidized starch, phosphoric acid esterified starch, cationized starch, or the like), cellulose derivatives (carboxymethyl cellulose (CMC), methylcellulose, hydroxypropyl cellulose, hydroxyethyl cellulose, salts thereof, or the like), polyvinylpyrrolidone, polyacrylic acid (salt), polyethylene glycol, a copolymer of (meth)acrylamide and/or (meth)acrylate salt [a (meth)acrylamide polymer, a (meth)acrylamide-(meth)acrylate salt copolymer, a (meth)acrylic acid alkyl (having 1 to 4 carbon atoms) ester-(meth)acrylate salt copolymer, or the like], a styrene-maleate salt copolymer, a mannich modified product of polyacrylamide, a formalin condensation type resin (a urea-formalin resin, a melamin-formalin resin, or the like), a polyamine or dialkylamine-epichlorohydrin copolymer, polyethyleneimine, casein, soybean protein, synthetic protein, and a galactomannan derivative. These thickeners may be used singly or two or more kinds thereof may be used concurrently.

In the case of using styrene-butadiene rubber (SBR) suitable as the aqueous binder, from the viewpoint of improving the coating property, the following thickener is preferably used concurrently. Examples of the thickener which is suitably used concurrently with styrene-butadiene rubber (SBR) include polyvinyl alcohol and a modified product thereof, starch and a modified product thereof, cellulose derivatives (such as carboxymethyl cellulose (CMC), methylcellulose, hydroxyethyl cellulose, and a salt thereof), polyvinylpyrrolidone, polyacrylic acid (salt), and polyethylene glycol. Among them, styrene-butadiene rubber (SBR) and carboxymethyl cellulose (CMC) or a salt thereof (CMC (salt)) are preferably combined. The mass content ratio of the SBR (aqueous binder) and the thickener is not particularly limited, but is preferably SBR (aqueous binder): the thickener=1:(0.3 to 0.7).

In a case where the negative electrode active material layer contains a binder, the content of the aqueous binder of the binder used in the negative electrode active material layer is preferably 80 to 100% by mass, preferably 90 to 100% by mass, and preferably 100% by mass. As a binder other than the aqueous binder, the binder used in the positive electrode active material layer is exemplified.

The amount of the binder contained in the negative electrode active material layer is not particularly limited as long as it is an amount in which the active material can be bound, and the amount of the binder is preferably 0.5 to 15% by mass, more preferably 1 to 10% by mass, further preferably 1 to 8% by mass, particularly preferably 2 to 4% by mass, and most preferably 2.5 to 3.5% by mass with respect to 100% by mass of the total amount of the negative electrode active material layer. Since the aqueous binder exhibits a high binding force, the active material layer can be formed by adding a smaller amount of the aqueous binder as compared with an organic solvent-based binder. The amount of the thickener contained in the negative electrode active material layer is obtained from the mass content ratio of the aqueous binder (SBR) and the thickener, the amount of the binder contained in the negative electrode active material layer, and the content of the aqueous binder of the binder contained in the negative electrode active material layer.

(Variation in Dispersibility of Binder)

In the present embodiment, it is characterized in that a difference between the maximum value and the minimum value of an area proportion (%) of a binder in an area of the field of view of each image of cross-sections of the negative electrode active material layer in a case where a plurality of arbitrary places is selected in a plane of the negative electrode active material layer is within 10%. That is, in the case of a large-sized battery having a large capacity and a large area, when sites having a large amount of the binder and sites having a small amount of the binder exist in a plane of the negative electrode active material layer, the expansion of the electrode becomes larger since the binding property in the inside of the electrode is small in the sites having a small amount of the binder. On the other hand, the expansion of the electrode becomes smaller since the binding property in the inside of the electrode is large in the sites having a large amount of the binder. An interelectrode distance between the positive electrode and the negative electrode becomes shorter in sites in which the expansion of the electrode is large, and the interelectrode distance between the positive electrode and the negative electrode becomes longer in sites in which the expansion of the electrode is small. Reaction is accelerated in sites in which the interelectrode distance is short since resistance becomes smaller and the amount of current becomes larger. Reaction is difficult to proceed in sites in which the interelectrode distance is long since resistance becomes larger and the amount of current becomes smaller. That is, non-uniformity of the reaction occurs in a plane of the negative electrode active material layer. In particular, in sites in which the amount of reaction is large, acceleration of the side reaction with an electrolyte solution and acceleration of degradation of the active material occur, and thus the cycle durability of the battery is significantly degraded. Further, it was found that, since the binding property is small in the sites having a small amount of the binder, desorption of the active material, or the like occurs in the process of charging and discharging, and according to this, the cycle durability is degraded. In an existing battery which is not a large-sized battery, by concurrently using the Si material+the carbon material described in JP 2009-517850 A, the cycle durability of the battery was not degraded, and thus the above-described problem did not occur (see Tables 1 to 3). That is, it was found that the above-described problem is new peculiar one occurring only in a case where the Si material+the carbon material are concurrently used and the battery is a large-sized battery having a large capacity and a large area. Regarding such a peculiar problem, it can be said that the above-described problem can be solved by controlling the variation in dispersibility of the binder within 10%, and the cycle durability of the battery can be significantly improved. Specifically, when the above-described requirement (the variation in dispersibility of the binder being set within 10%) is satisfied, in a large-sized battery having a large capacity and a large area, a variation in amount of expansion at the time of charging in a plane of the negative electrode active material layer becomes smaller. According to this, the phenomenon that non-uniformity of reactivity with Li ions is caused by an interelectrode distance between a positive electrode and a negative electrode being increased in a certain site and being decreased in a certain site is suppressed, and the cycle durability of the battery is improved. In addition, by setting the variation in dispersibility of the binder in the negative electrode active material layer within 10%, in the large-sized battery, sites in which the binder in the negative electrode active material layer is not sufficient are decreased. According to this, it is possible to prevent the active material from dropping off and to improve the cycle durability of the battery. Further, the "difference between the maximum value and the minimum value of an area proportion (%) of a binder in an area of the field of view of each image of cross-sections of the negative electrode active material layer in a case where a plurality of arbitrary places is selected in a plane of the negative electrode active material layer" is also simply referred to as a "variation in dispersibility of the binder".

The difference between the maximum value and the minimum value of an area proportion (%) of a binder in an area of the field of view of each image of cross-sections of the negative electrode active material layer in a case where a plurality of arbitrary places is selected in a plane of the negative electrode active material layer (variation in dispersibility of the binder) is preferably within 9.4%, more preferably within 5%, and particularly preferably within 3.6%. When the variation in dispersibility of the binder is set within the above-described suitable range, the cycle durability of the battery can be further improved. Hereinafter, the variation in dispersibility of the binder will be described in detail.

As the arbitrary places in a plane of the negative electrode active material layer, from the viewpoint of measuring the variation in dispersibility of the binder in a plane of the negative electrode active material layer, arbitrary places may be selected so as to include the vicinity of an end portion, the vicinity of a center portion, and the vicinity of an intermediate portion between the end portion and the center portion in a plane of the negative electrode active material layer in a balanced manner.

Figure 3A:
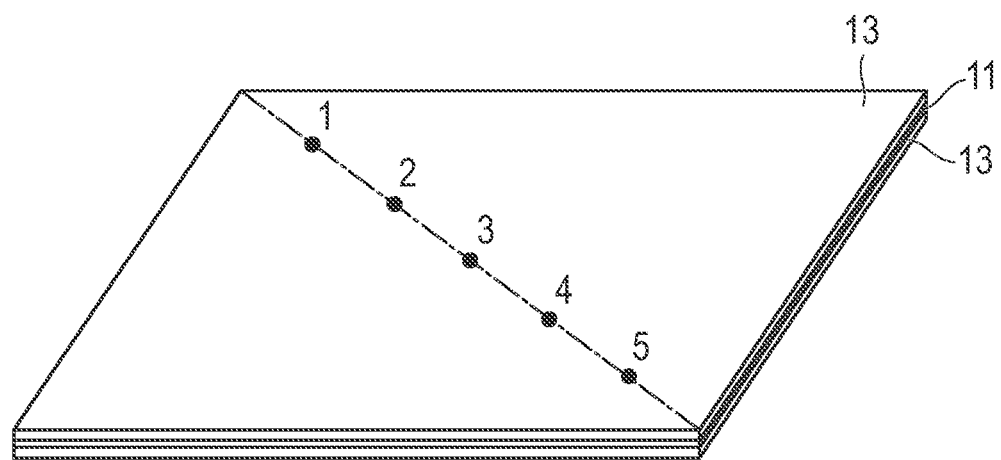
FIG. 3A is a perspective view of a rectangular negative electrode that is a constituent member of the flat type (laminate type) lithium ion secondary battery, which is not a bipolar type, as an embodiment of the non-aqueous electrolyte secondary battery according to the present invention.
Figure 3B:
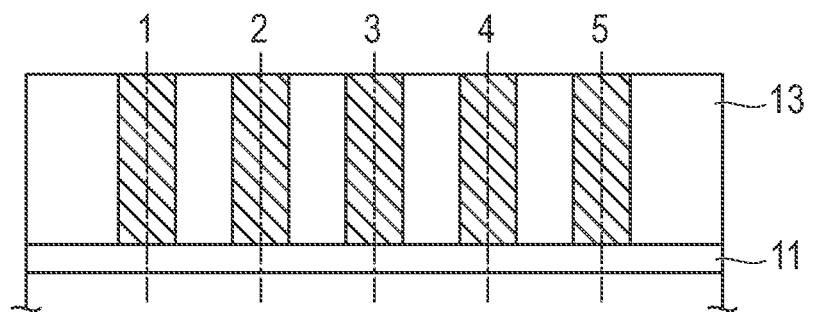
FIG. 3B is a cross-sectional view taken along a diagonal line (dashed-dotted line) connecting opposing corners in a plane of the rectangular negative electrode of FIG. 3A.

Regarding the arbitrary places in a plane of the negative electrode active material layer, a plurality of arbitrary places (two or more) may be selected, but from the viewpoint of measuring the variation in dispersibility of the binder in a plane of the negative electrode active material layer as described above, five or more arbitrary places are preferable. Specifically, for example, places obtained by equally dividing a diagonal line (dashed-dotted line) in a plane of the negative electrode active material layer into six illustrated in FIG. 3A (places marked with number symbols 1 to 5 in FIG. 3A), or the like can be appropriately selected so as to include the vicinity of the end portion, the vicinity of the center portion, and the vicinity of the intermediate portion between the end portion and the center portion in a plane of the negative electrode active material layer in a balanced manner. However, the arbitrary place is not limited to the places illustrated in FIG. 3A, but may further include places obtained by equally dividing another diagonal line crossing the diagonal line illustrated in FIG. 3A into six (or more). Alternatively, places obtained by equally dividing an axis line in a longitudinal direction and an axis line in a shorter direction, which pass through the center point in a plane of the negative electrode active material layer, appropriately into six (or more) may be selected, and there is no particular limitation as long as the vicinity of the end portion, the vicinity of the center portion, and the vicinity of the intermediate portion between the end portion and the center portion in a plane of the negative electrode active material layer are included in a balanced manner. Incidentally, also in Examples, places obtained by equally dividing the diagonal line (dashed-dotted line) in a plane of the negative electrode active material layer into six illustrated in FIG. 3A (places marked with number symbols 1 to 5 in FIG. 3A) were selected. Incidentally, FIG. 3A is a perspective view of a rectangular negative electrode that is a constituent member of the flat type (laminate type) lithium ion secondary battery, which is not a bipolar type, as the embodiment of the non-aqueous electrolyte secondary battery according to the present invention. FIG. 3B is a cross-sectional view taken along a diagonal line (dashed-dotted line) connecting opposing corners in a plane of the rectangular negative electrode of FIG. 3A.

As for each image of cross-sections of the negative electrode active material layer, each image of secondary electron images or reflection electron images obtained by observing, with an electron microscope, cross-sectional portions corresponding to arbitrary places in a plane of the negative electrode active material layer in the cross-section of the negative electrode active material layer, which is cut such that the arbitrary places in a plane of the negative electrode active material layer described above are included, is used. For example, as each image of cross-sections of the negative electrode active material layer, it is possible to use each image of secondary electron images or reflection electron images obtained by observing, with an electron microscope, five sites marked with number symbols 1 to 5 in FIG. 3B corresponding to the places of number symbols 1 to 5 in FIG. 3A and the vicinities thereof (shaded portions in the drawing). Also in Examples, each image of reflection electron images obtained by observing, with an electron microscope, five sites marked with number symbols 1 to 5 in FIG. 3B and the vicinities thereof (shaded portions in the drawing) were used.

As for the area of the field of view in each image of cross-sections of the negative electrode active material layer, it is possible to use a whole area (whole field of view) of each image of reflection electron images obtained by observing, with an electron microscope, arbitrary sites in a thickness direction of the cross-section corresponding to an arbitrary place in a plane of the negative electrode active material layer. The area of the field of view of each image of cross-sections of the negative electrode active material layer is not particularly limited, but for example, a rectangle in which the vertical side (thickness direction) is the thickness of the negative electrode active material layer and the horizontal side (direction perpendicular to the thickness direction) is 100 μm is used. A rectangle in which the vertical side is the thickness of the negative electrode active material layer and the horizontal side is 50 μm is further preferably used. A rectangle in which the vertical side is the thickness of the negative electrode active material layer and the horizontal side is 25 μm is further preferably used. In the Examples, as the "area of the field of view of each image of cross-sections of the negative electrode active material layer", a whole area (whole field of view) of the reflection electron images obtained by observing, with an electron microscope, five sites illustrated in FIG. 3B and the vicinities thereof (shaded portions in the drawing) (an area of a rectangular in which the vertical side is the thickness of the negative electrode active material layer and the horizontal side is 100 μm) was used.

(Calculation Method of Area Proportion (%) of Binder)

Further, a method of calculating the area proportion (%) of the binder in the area of the field of view of each image of cross-sections of the negative electrode active material layer is not limited, but for example, the following method of image processing the cross-sections of the negative electrode active material layer is mentioned. That is, the following method can be used. The negative electrode is subjected to cross-section processing by an arbitrary cross-section processing method, and then Os is added to the binder in the cross-sections of the negative electrode active material layer. Thereafter, a secondary electron image or a reflection electron image obtained by observing, with an electron microscope, a cross-sectional portion corresponding to an arbitrary place in a plane of the negative electrode active material layer is binarized with a threshold for distinguishing the binder added with Os and a site other than the binder, and then the area proportion is calculated. Specifically, a secondary electron image or a reflection electron image is captured using Os with an electron microscope, and then image processing software is used with respect to the image. The image processing software is not limited, but for example, AxioVision manufactured by Carl Zeiss AG, WinROOF manufactured by MITANI CORPORATION, Image-Pro manufactured by Media Cybernetics, and the like can be used. In the binarization processing, by setting an appropriate threshold by which contrast between the binder added with Os and a site other than the binder may be distinguished, the amount of area of the binder in the area of the field of view of each image of cross-sections of the negative electrode active material layer can be calculated.

Incidentally, the contrast can be identified using the reflection electron image only by adding Os, but further preferably, the contrast is more easily identified by using mapping process by EDX.

Further, as the calculation method of the area proportion (%) of the binder, the method using Os described above is a method which can be used suitably in the case of using, as a binder, a polymer (rubber) having an unsaturated double bond such as SBR, which is an aqueous binder. Besides, for an organic solvent-based binder such as PVDF, it is possible to use a method in which the area proportion of the binder is calculated by using fluorine instead of Os, or the like. For example, for the organic solvent-based binder such as PVDF, the area proportion (%) of the binder can be calculated by extracting fluorine (F) by using SEM-EDX mapping and performing image processing.

Incidentally, the variation in dispersibility of the binder described above corresponds to a case where one sheet of the negative electrode is used, but preferably, similar variation measurement is preferably performed for a plurality of sheets. Specifically, three sheets or more are preferable, five sheets or more are more preferable, and seven sheets or more are further preferable.

In order to control a variation in dispersibility of the binder described above, mainly, a vibration time, an ultrasonic wavelength, or the like when stirring is performed using ultrasonic vibration at the time of producing the negative electrode active material (water-based) slurry may be changed to adjust the variation. In addition, mainly, a dispersing (mixing under stirring) time or the like at the time of producing the negative electrode active material (water-based) slurry may be changed to adjust the variation. Alternatively, for example, mainly, the type of a dispersing mixer and the rotational speed may be changed to adjust the variation, and thus there is no particular limitation.

In addition to the active material and the binder, the negative electrode active material layer further contains other additives such as a conductive aid, an electrolyte (such as a polymer matrix, an ion conductive polymer, or an electrolyte solution), and a lithium salt for enhancing ion conductivity, as necessary, in addition to the above-described thickener.

(Conductive Aid)

The conductive aid is an additive to be blended for improving conductivity of the positive electrode active material layer or the negative electrode active material layer. Examples of the conductive aid include, although not particularly limited, carbon black such as acetylene black, Ketjen black, or furnace black, carbon powder such as channel black, thermal black, or graphite, various carbon fibers such as vapor-grown carbon fiber (VGCF; registered trademark), and a carbon material such as expanded graphite. When the active material layer contains the conductive aid, the electron network in the inside of the active material layer is effectively formed, thereby contributing to the improvement of output characteristics of a battery.

The content of the conductive aid in the negative electrode active material layer is preferably 1 to 10% by mass and more preferably 1 to 8% by mass. When the blending ratio (content) of the conductive aid is defined in the above range, the following effects are exhibited. That is, as the electron conductivity is sufficiently ensured without inhibiting an electrode reaction, a decrease in energy density caused by decreased electrode density can be suppressed, and also an improvement in energy density based on improvement in electrode density can be obtained.

(Lithium Salt)

The lithium salt is contained in the negative electrode active material layer by the aforementioned electrolyte infiltrating to the negative electrode active material layer. Therefore, the specific form of the lithium salt which may be contained in the negative electrode active material layer is the same as the lithium salt constituting the electrolyte. Examples of the lithium salt include $Li(C_2F_5SO_2)_2N$, $LiPF_6$, $LiBF_4$, $LiClO_4$, $LiAsF_6$, and $LiCF_3SO_3$.

(Ion Conductive Polymer)

Examples of the ion conductive polymer include a polyethylene oxide (PEO)-based polymer and a polypropylene oxide (PPO)-based polymer.

The blending ratio of the component contained in the negative electrode active material layer is not particularly limited. The blending ratio may be adjusted while reference can be suitably made to the conventionally known knowledge about a lithium ion secondary battery.

The negative electrode (negative electrode active material layer) can be formed by an ordinary method of applying (coating) a slurry, or by any of a kneading method, a sputtering method, a vapor deposition method, a CVD method, a PVD method, an ion plating method, and a thermal spraying method.

The thickness of each active material layer (active material layer on one surface of a current collector) is not particularly limited as well, and reference can be suitably made to the conventionally known knowledge about a battery. For example, the thickness of each active material layer is typically about 1 to 500 μm and preferably 2 to 100 μm, considering the purpose of use (for example, focused on output or focused on energy, or the like) or ion conductivity of a battery.

The porosity of each active material layer (the positive electrode active material layer and the negative electrode active material layer) is in a range of 10 to 45% by volume, preferably 15 to 40% by volume, and more preferably 20 to 35% by volume, with respect to the total volume of the active material layers. The reason for this is that, when the porosity is in the above range, pores of each active material layer can effectively function as a path of supplying an electrolyte solution (Li ions) to immerse an electrolyte solution into the inside of each active material layer and accelerate an electrode reaction without impairing characteristics such as battery capacity or strength.

(Variation in Dispersibility of Pores)

In the present embodiment, it is preferable that a difference between the maximum value and the minimum value of an area proportion (%) of pores in each image of cross-sections of the negative electrode active material layer in a case where a plurality of arbitrary places in a plane of the negative electrode active material layer is selected is within 10%. That is, in the case of a large-sized battery having a large capacity and a large area, when sites having a large porosity and sites having a small porosity exist in a plane of the negative electrode active material layer, since the sites having a large porosity can absorb the expansion of Si by pores (voids), the thickness of the electrode becomes smaller as compared with the sites having a small porosity. According to this, since the interelectrode distance between the positive electrode and the negative electrode becomes shorter in sites having a large amount of Si-based material, resistance becomes smaller and the amount of current becomes larger so that reaction is accelerated and non-uniformity of the reaction occurs in a plane of the negative electrode active material layer. It was found that the cycle durability of the battery is degraded in sites having a large amount of reaction since acceleration of the side reaction with the electrolyte solution, acceleration of degradation of the active material, and the closure of the pores of the separator occur. In a conventional battery, which is not a large-sized battery, the cycle durability of the battery was not degraded and thus the above-described problem did not occur by concurrently using the Si material+the carbon material described in JP 2009-517850 A (see Tables 1 to 3). That is, it was found that the above-described problem is a new peculiar problem occurring only in a case where the Si material+the carbon material are concurrently used and the battery is a large-sized battery having a large capacity and a large area. Regarding such a peculiar problem, it is considered that a variation in an amount of expansion of Si at the time of charging in a plane of the negative electrode active material layer is decreased by controlling the variation in dispersibility of the pores within 10% in a case where the Si material+the carbon material are concurrently used and the battery is a large-sized battery having a large capacity and a large area, and thus the above-described problem can be solved. According to this, it can be said that the cycle durability of the battery can be significantly improved. Herein, when the above-described requirement (the variation in dispersibility of pores being set within 10%) is satisfied, the variation in an amount of expansion at the time of charging in a plane of the negative electrode active material layer can be further decreased in a large-sized battery having a large capacity and a large area. According to this, the phenomenon that non-uniformity of reactivity with Li ions is caused by an interelectrode distance between a positive electrode and a negative electrode being increased in a certain site and being decreased in a certain site is suppressed. Thus, the side reaction with an electrolyte solution, degradation of the active material, the closure of the pores of the separator, and the like can also be effectively suppressed. As a result, it can be said that further improvement in cycle durability of the battery is achieved. Further, the "difference between the maximum value and the minimum value of an area proportion (%) of pores in each image of cross-sections of the negative electrode active material layer in a case where a plurality of arbitrary places in a plane of the negative electrode active material layer is selected" is also simply referred to as a "variation in dispersibility of pores".

The difference between the maximum value and the minimum value of an area proportion (%) of pores in each image of cross-sections of the negative electrode active material layer in a case where a plurality of arbitrary places in a plane of the negative electrode active material layer is selected (variation in dispersibility of pores) is preferably within 10%, more preferably within 8.5%, further preferably within 7%, and particularly preferably within 6%, and of them, preferably within 5.3%. When the variation in dispersibility of the pores is set within the above-described suitable range, the cycle durability of the battery can be further improved. Hereinafter, the variation in dispersibility of pores will be described in detail.

As an arbitrary place in a plane of the negative electrode active material layer, from the viewpoint of measuring the variation in dispersibility of pores in a plane of the negative electrode active material layer, arbitrary places may be selected so as to include the vicinity of the end portion, the vicinity of the center portion, and the vicinity of the intermediate portion between the end portion and the center portion in a plane of the negative electrode active material layer in a balanced manner.

Regarding the arbitrary places in a plane of the negative electrode active material layer, a plurality of arbitrary places (two or more) may be selected, but from the viewpoint of measuring the variation in dispersibility of pores in a plane of the negative electrode active material layer as described above, five or more arbitrary places are preferable. Specifically, for example, places obtained by equally dividing a diagonal line (dashed-dotted line) in a plane of the negative electrode active material layer into six illustrated in FIG. 3A (places marked with number symbols 1 to 5 in FIG. 3A), or the like can be appropriately selected so as to include the vicinity of the end portion, the vicinity of the center portion, and the vicinity of the intermediate portion between the end portion and the center portion in a plane of the negative electrode active material layer in a balanced manner. However, the arbitrary place is not limited to the places illustrated in the FIG. 3A, but may further include places obtained by equally dividing another diagonal line crossing the diagonal line illustrated in the FIG. 3A into six (or more). Alternatively, places obtained by equally dividing an axis line in a longitudinal direction and an axis line in a shorter direction, which pass through the center point in a plane of the negative electrode active material layer, appropriately into three or more may be selected, and there is no particular limitation as long as the vicinity of the end portion, the vicinity of the center portion, and the vicinity of the intermediate portion between the end portion and the center portion in a plane of the negative electrode active material layer are included in a balanced manner. Incidentally, also in the Examples, places obtained by equally dividing the diagonal line (dashed-dotted line) in a plane of the negative electrode active material layer into six illustrated in the FIG. 3A (places marked with number symbols 1 to 5 in the FIG. 3A) were selected.

As for each image of cross-sections of the negative electrode active material layer, each image of secondary electron images or reflection electron images obtained by observing, with an electron microscope, cross-sectional portions corresponding to the arbitrary places in a plane of the negative electrode active material layer in the cross-section of the negative electrode active material layer, which is cut such that the arbitrary places in a plane of the negative electrode active material layer described above are included, is used. For example, as each image of cross-sections of the negative electrode active material layer, it is possible to use each image of secondary electron images or reflection electron images obtained by observing, with an electron microscope, five sites marked with number symbols 1 to 5 in FIG. 3B corresponding to the places of number symbols 1 to 5 in the FIG. 3A and the vicinities thereof (shaded portions in the drawing). Also in the Examples, each image of reflection electron images obtained by observing, with an electron microscope, five sites marked with number symbols 1 to 5 in the FIG. 3B and the vicinities thereof (shaded portions in the drawing) were used.

As for the area of each image of cross-sections of the negative electrode active material layer, it is possible to use a whole area (whole field of view) of each image of reflection electron images obtained by observing, with an electron microscope, arbitrary sites in a thickness direction of the cross-section corresponding to arbitrary places in a plane of the negative electrode active material layer. The area of each image of cross-sections of the negative electrode active material layer is not particularly limited, but for example, a rectangle in which the vertical side (thickness direction) is the thickness of the negative electrode active material layer and the horizontal side (direction perpendicular to the thickness direction) is 100 µm is used. A rectangle in which the vertical side is the thickness of the negative electrode active material layer and the horizontal side is 50 µm is further preferably used. A rectangle in which the vertical side is the thickness of the negative electrode active material layer and the horizontal side is 25 µm is further preferably used. In Examples, as the "(area of) each image of cross-sections of the negative electrode active material layer", a whole area (whole field of view) of the reflection electron images obtained by observing, with an electron microscope, five sites illustrated in the FIG. 3B and the vicinities thereof (shaded portions in the drawing) (an area of a rectangular in which the vertical side is the thickness of the negative electrode active material layer and the horizontal side is 100 μm) was used.

(Calculation Method of Area Proportion (%) of Porosity)

Further, a method of calculating the area proportion (%) of pores in each image of cross-sections of the negative electrode active material layer is not limited, but for example, the following method of image processing the cross-sections of the negative electrode active material layer is mentioned. That is, the following method can be used. The negative electrode is subjected to cross-section processing by an arbitrary cross-section processing method, and then a secondary electron image or a reflection electron image obtained by observing, with an electron microscope, a cross-sectional portion corresponding to an arbitrary place in a plane of the negative electrode active material layer is binarized with a threshold for distinguishing the pore and a solid portion other than the pore, and then the area proportion is calculated. Specifically, a secondary electron image or a reflection electron image was captured with an electron microscope, and image processing software is used with respect to the image. The image processing software is not limited, but for example, AxioVision manufactured by Carl Zeiss AG, WinROOF manufactured by MITANI CORPORATION, Image-Pro manufactured by Media Cybernetics, and the like can be used. In the binarization processing, by setting an appropriate threshold by which contrast between the solid portion and the pore may be distinguished, the amount of area of the pore in the area of each image of cross-sections of the negative electrode active material layer can be calculated.

Incidentally, the variation in dispersibility of porosity described above has been described using one sheet of the negative electrode, but from the viewpoint of increasing the accuracy of the electrode dispersibility, preferably, similar variation measurement is preferably performed using a plurality of sheets. Specifically, three sheets or more are preferable, five sheets or more are more preferable, and seven sheets or more are further preferable.

In order to control a variation in dispersibility of pores, mainly, the solid content ratio of the slurry, the dispersing time or the number of rotations when the slurry is dispersed may be changed to adjust the variation. Alternatively, for example, mainly, the type of a dispersing mixer may be changed to adjust the variation, and thus there is no particular limitation.

<Current Collector>

The current collector (11, 12) is made of an electrically conductive material. The size of the respective current collector is determined depending on the use of application of the battery. For example, a current collector having a large area is used for a large size battery for which a high energy density is required.

The thickness of the current collector is not particularly limited as well. The thickness of the current collector is typically about 1 to 100 μm.

The shape of the respective current collector is not particularly limited as well. The laminate type battery 10 illustrated in FIG. 1 can use a mesh-shaped current collector (such as an expanded grid) or the like as well as a current collecting foil.

Incidentally, a current collecting foil is preferably used in a case where a thin film alloy as the negative electrode active material is formed directly on a negative electrode current collector 11 by a sputtering method, or the like.

The material constituting the current collector is not particularly limited. For example, a metal or a resin in which an electrically conductive filler is added to an electrically conductive polymer material or a non-electrically conductive polymer material may be adopted.

Specific examples of the metal include aluminum, nickel, iron, stainless steel, titanium, and copper. Other than these, a clad material of nickel and aluminum, a clad material of copper and aluminum, or a plating material of a combination of these metals can be preferably used. In addition, the metal may be a foil obtained by coating aluminum on a metal surface. Among them, from the viewpoint of electron conductivity, potential for operating a battery, adhesiveness of the negative electrode active material to the current collector by sputtering, and the like, aluminum, stainless steel, copper, and nickel are preferable.

Further, examples of the electrically conductive polymer material include polyaniline, polypyrrole, polythiophene, polyacetylene, polyparaphenylene, polyphenylene vinylene, polyacrylonitrile, and polyoxadiazole. Such an electrically conductive polymer material has the advantage in simplification of the manufacturing process and lightness of the current collector since the electrically conductive polymer material has sufficient electric conductivity even if an electrically conductive filler is not added thereto.

Examples of the non-electrically conductive polymer material include polyethylene (PE; such as high-density polyethylene (HDPE) or low-density polyethylene (LDPE)), polypropylene (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), and polystyrene (PS). Such a non-electrically conductive polymer material may have excellent potential resistance or solvent resistance.

An electrically conductive filler may be added to the electrically conductive polymer material or the non-electrically conductive polymer material described above, as necessary. In particular, when the resin serving as a substrate of the current collector consists only of a non-electrically conductive polymer, the electrically conductive filler is essential to impart electric conductivity to the resin.

The electrically conductive filler is not particularly limited as long as it is a substance having electric conductivity. Examples of a material excellent in electric conductivity, potential resistance, or lithium ion insulation characteristics include metal and electrically conductive carbon. The metal is not particularly limited; however, the metal is preferably at least one element selected from the group consisting of Ni, Ti, Al, Cu, Pt, Fe, Cr, Sn, Zn, In, Sb, and K, or an alloy or metal oxide containing these metals. Further, the electrically conductive carbon is not particularly limited. The electrically conductive carbon is preferably at least one material selected from the group consisting of acetylene black, Vulcan, Black Pearl, carbon nanofiber, Ketjen black, carbon nanotube, carbon nanohorn, carbon nanoballoon, and fullerene.

The adding amount of the electrically conductive filler is not particularly limited as long as it imparts sufficient electric conductivity to the current collectors. In general, the amount thereof is about 5 to 35% by mass.

<Separator (Electrolyte Layer)>

A separator has a function of maintaining an electrolyte to ensure lithium ion conductivity between the positive electrode and the negative electrode and a function of a partition wall between the positive electrode and the negative electrode.

Examples of the separator shape may include a porous sheet separator and a non-woven separator composed of a polymer or a fiber which absorbs and maintains the electrolyte.

As the porous sheet separator composed of a polymer or a fiber, a microporous (microporous membrane) separator can be used, for example. Specific examples of the porous sheet composed of a polymer or a fiber include a microporous (microporous membrane) separator which is composed of a polyolefin such as polyethylene (PE) or polypropylene (PP); a laminate in which a plurality of these is laminated (for example, a laminate having a three-layer structure of PP/PE/PP), and a hydrocarbon-based resin such as polyimide, aramid, or polyvinylidene fluoride-hexafluoropropylene (PVdF-HFP), or glass fiber.

The thickness of the microporous (microporous membrane) separator cannot be uniformly defined as it varies depending on use of application. For example, for an application in a secondary battery for driving a motor of an electric vehicle (EV), a hybrid electric vehicle (HEV), a fuel cell vehicle (FCV), and the like, the thickness is desirably 4 to 60 μm as a monolayer or a multilayer. The fine pore diameter of the microporous (microporous membrane) separator is desirably 1 μm or less at most (typically, the pore diameter is about several tens of nanometers).

As the non-woven separator, conventionally known ones such as cotton, rayon, acetate, nylon, and polyester; polyolefin such as PP or PE; polyimide and aramid are used singly or as a mixture. In addition, the bulk density of the non-woven fabric is not particularly limited as long as sufficient battery characteristics are obtained by an impregnated electrolyte. Furthermore, it is sufficient that the thickness of the non-woven separator is the same as that of the electrolyte layer, and the thickness is preferably 5 to 200 μm and particularly preferably 10 to 100 μm.

In addition, as described above, the separator contains an electrolyte. The electrolyte is not particularly limited as long as it can exhibit such functions, but a liquid electrolyte or a gel polymer electrolyte is used. By using the gel polymer electrolyte, a distance between electrodes is stabilized and an occurrence of polarization is suppressed so that the durability (cycle characteristics) is improved.

The liquid electrolyte has a function as a carrier of lithium ion. The liquid electrolyte constituting the electrolyte solution layer has a form in which a lithium salt as a supporting salt is dissolved in an organic solvent as a plasticizer. Examples of the organic solvent which can be used include carbonates such as ethylene carbonate (EC), propylene carbonate (PC), dimethyl carbonate (DMC), diethyl carbonate (DEC), and ethyl methyl carbonate. Further, as the lithium salt, a compound which can be added to an active material layer of an electrode, such as $Li(CF_3SO_2)_2N$, $Li(C_2F_5SO_2)_2N$, $LiPF_6$, $LiBF_4$, $LiClO_4$, $LiAsF_6$, $LiTaF_6$, and $LiCF_3SO_3$, can be adopted in the same manner. The liquid electrolyte may further contain an additive in addition to the aforementioned components. Specific examples of such a compound include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methylene ethylene carbonate, and 1,1-dimethyl-2-methylene ethylene carbonate. Among them, vinylene carbonate, methylvinylene carbonate, and vinylethylene carbonate are preferable, and vinylene carbonate and vinylethylene carbonate are more preferable. These cyclic carbonate esters may be used singly or two or more kinds thereof may be used concurrently.

The gel polymer electrolyte has a configuration that the above-described liquid electrolyte is injected to a matrix polymer (host polymer) consisting of an ion conductive polymer. Use of a gel polymer electrolyte as an electrolyte is excellent in that the fluidity of an electrolyte disappears and ion conductivity between layers is blocked. Examples of the ion conductive polymer which is used as the matrix polymer (host polymer) include polyethylene oxide (PEO), polypropylene oxide (PPO), polyethylene glycol (PEG), polyacrylonitrile (PAN), polyvinylidene fluoride-hexafluoropropylene (PVdF-HEP), polymethyl methacrylate (PMMA), and a copolymer thereof.

According to forming of a cross-linked structure, the matrix polymer of a gel electrolyte can exhibit excellent mechanical strength. For forming a cross-linked structure, it is sufficient to perform a polymerization treatment of a polymerizable polymer for forming a polymer electrolyte (for example, PEO or PPO), such as thermal polymerization, UV polymerization, radiation polymerization, or electron beam polymerization, by using a suitable polymerization initiator.

Further, as the separator, a separator in which a heat resistant insulating layer is laminated on a porous substrate (a separator with a heat resistant insulating layer) such as a porous sheet separator or a non-woven separator is preferable. The heat resistant insulating layer is a ceramic layer containing inorganic particles and a binder. As the separator with a heat resistant insulating layer, those having high heat resistance, that is, a melting point or a heat softening point of 150° C. or higher and preferably 200° C. or higher are used. By having the heat resistant insulating layer, internal stress of the separator which increases when the temperature increases is alleviated so that the effect of suppressing thermal shrinkage can be obtained. As a result, an occurrence of a short circuit between electrodes of the battery can be prevented so that a battery configuration in which the deterioration in performance due to an increase in temperature hardly occurs is obtained. In addition, by having the heat resistant insulating layer, the mechanical strength of the separator with a heat resistant insulating layer is improved so that the membrane of the separator is hardly broken. Furthermore, because of the effect of suppressing thermal shrinkage and a high mechanical strength, the separator is hardly curled during the manufacturing process of the battery.

The inorganic particles in the heat resistant insulating layer contribute to the mechanical strength or the effect of suppressing thermal shrinkage of the heat resistant insulating layer. The material used as the inorganic particles is not particularly limited. Examples thereof include oxides ($SiO_2$, $Al_2O_3$, $ZrO_2$, and $TiO_2$), hydroxides, and nitrides of silicon, aluminum, zirconium and titanium, and a composite thereof.

These inorganic particles may be those which are derived from mineral resources such as boehmite, zeolite, apatite, kaolin, mullite, spinel, olivine, and mica, or those which are artificially synthesized. In addition, these inorganic particles may be used singly or two or more kinds thereof may be used concurrently. Among them, from the viewpoint of cost, it is preferable to use silica ($SiO_2$) or alumina ($Al_2O_3$) and it is more preferable to use alumina ($Al_2O_3$).

The weight per unit area of heat resistant particles is not particularly limited, but is preferably 5 to 15 $g/m^2$. With this range, sufficient ion conductivity is obtained and heat resistant strength is maintained, which is preferable.

The binder in the heat resistant insulating layer has a role to bond the inorganic particles to one another or the inorganic particles to the porous substrate (porous resin substrate layer). With this binder, the heat resistant insulating layer is stably formed and peeling between porous substrate (porous substrate layer) and the heat resistant insulating layer.

The binder used in the heat resistant insulating layer is not particularly limited, and for example, compounds such as carboxymethyl cellulose (CMC), polyacrylonitrile, cellulose, an ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), and methyl acrylate may be used as the binder. Among them, carboxymethyl cellulose (CMC), methyl acrylate, or polyvinylidene fluoride (PVDF) is preferably used. Those compounds may be used singly or two or more kinds thereof may be used concurrently.

The content of the binder in the heat resistant insulating layer is preferably 2 to 20% by mass with respect to 100% by mass of the heat resistant insulating layer. When the content of the heat resistant insulating layer is 2% by mass or more, the peeling strength between the heat resistant insulating layer and the porous substrate (porous substrate layer) can be increased and vibration resistance of the separator can be improved. On the other hand, when the content of the binder is 20% by mass or less, a gap between inorganic particles is maintained at an appropriate level so that sufficient lithium ion conductivity can be ensured.

The thermal shrinkage rate of the separator with a heat resistant insulating layer is preferably 10% or less in both MD and TD after being held for 1 hour under the condition of 150° C. and 2 $gf/cm^2$. Shrinkage of the separator can be effectively prevented even when the internal temperature of the battery reaches 150° C. due to an increased amount of heat generated from the positive electrode as such a highly heat resistant material is used. As a result, an occurrence of a short circuit between electrodes of the battery can be prevented so that a battery configuration in which the deterioration in performance due to an increase in temperature hardly occurs is obtained.

<Current Collecting Plate (Tab)>

In the lithium ion secondary battery, a current collecting plate (tab) that is electrically connected to the current collector is taken out of the laminate film as an outer casing material for the purpose of drawing the current to the outside of the battery.

The material constituting the current collecting plate is not particularly limited and a known highly electrical conducting material which is used in the related art as a current collecting plate for a lithium ion secondary battery may be used. As the constituent material of the current collecting plate, for example, a metal material such as aluminum, copper, titanium, nickel, stainless steel (SUS), or an alloy thereof is preferable. From the viewpoint of lightweight, corrosion resistance, and high electrical conductivity, the material is more preferably aluminum or copper and is particularly preferably aluminum. Incidentally, the same material or different materials may be used in the positive electrode current collecting plate (positive electrode tab) and the negative electrode current collecting plate (negative electrode tab).

Figure 2:
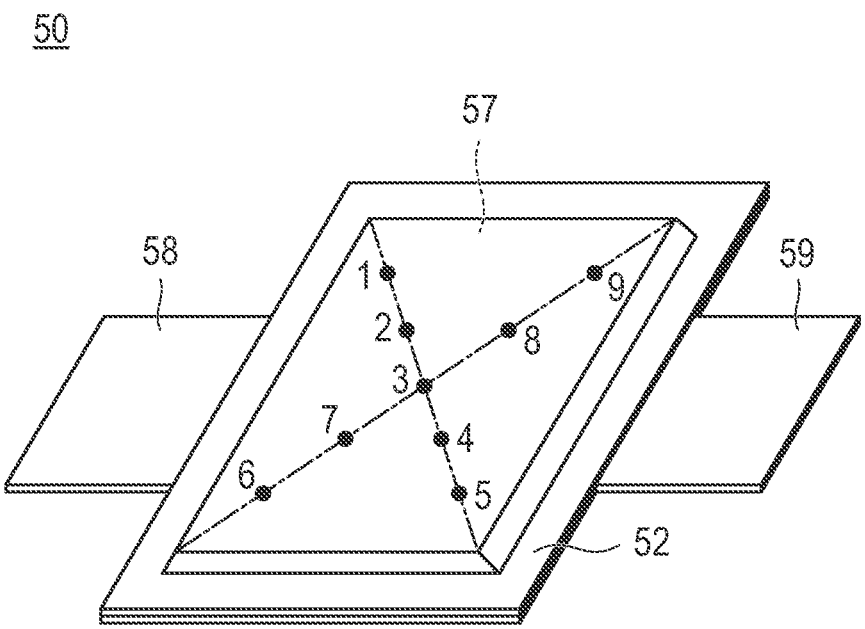
FIG. 2 is a perspective view illustrating the appearance of a flat lithium ion secondary battery as a representative embodiment of the non-aqueous electrolyte secondary battery according to the present invention.

In addition, the taking out of tabs 58 and 59 illustrated in FIG. 2 is not particularly limited as well. A positive electrode tab 58 and a negative electrode tab 59 may be taken out from the same side or each of the positive electrode tab 58 and the negative electrode tab 59 may be divided into plural tabs and then taken out from each side, and it is not limited to the form illustrated in FIG. 2. In addition, it is also possible to form a terminal, for example, using a barrel can (metal can) instead of a tab in a winding type lithium ion battery.

<Seal Portion>

A seal portion is a unique member for the series laminate type battery and has a function of preventing the leakage of the electrolyte layer. Furthermore, it is also possible to prevent the contact between adjacent current collectors in the battery or the short circuit caused by slight lack of uniformity of the ends of the laminated electrodes.

The constituting material of the seal portion is not particularly limited and a polyolefin resin such as polyethylene or polypropylene, an epoxy resin, rubber, polyimide, and the like may be used. Among these, from the viewpoint of corrosion resistance, chemical resistance, film forming property, economic efficiency, and the like, it is preferable to use a polyolefin resin.

<Positive Electrode Terminal Lead and Negative Electrode Terminal Lead>

A lead that is used in a laminate types secondary battery known in the related art can be used as materials of the negative electrode and the positive electrode terminal lead. Incidentally, a portion taken out from the battery outer casing material is preferably coated with a heat resistant and insulating thermally shrunken tube or the like so that it is not in contact with a peripheral device or wire to cause electric leakage which affects a product (for example, an automobile component, in particular, an electronic device).

<Battery Outer Casing Body>

As the battery outer casing body, a metal can casing conventionally known can be used. Other than this, the power generating element 21 may be packed using a laminate sheet 29 as the outer casing material as illustrated in FIG. 1. The laminate film may be configured, for example, as a three-layer structure formed by laminating polypropylene, aluminum, and nylon in this order. By using such a laminate film, it is possible to easily perform unsealing of the outer casing material, addition of a capacity restoring material, and re-sealing of the outer casing material. A laminate film is desirable from the viewpoint of an increase in output and excellent cooling performance and of being suitably utilizable in a battery for a large-sized device such as EV or HEV. In addition, an outer casing body formed of a laminate film containing aluminum (for example, an aluminum laminate sheet bag; see Examples) is more preferable since the group pressure applied from the outside to the power generating element can be easily adjusted and thus the thickness of an electrolyte solution layer can be easily adjusted to a desired value. For the laminate film containing aluminum, an aluminum laminate film obtained by laminating the above-described polypropylene, aluminum, and nylon in this order, or the like can be used.

[Cell Size]

FIG. 2 is a perspective view illustrating the appearance of a flat lithium ion secondary battery as a representative embodiment of a secondary battery. According to a preferred embodiment of the present invention, a flat stack type laminate battery having a configuration in which the power generating element is sealed in the battery outer casing body formed of a laminate film containing aluminum such as this lithium ion secondary battery is provided.

As illustrated in FIG. 2, a flat lithium ion secondary battery 50 has a rectangular flat shape, and a positive electrode tab 58 and a negative electrode tab 59 are taken out from both sides for extracting the electric power. A power generating element 57 is covered with a battery outer casing material 52 of the lithium ion secondary battery 50, and the periphery of the battery outer casing material 52 is fused by heat. The power generating element 57 is sealed in a state in which the positive electrode tab 58 and the negative electrode tab 59 are taken out to the outside. Herein, the power generating element 57 corresponds to the power generating element 21 of the lithium ion secondary battery 10 illustrated in FIG. 1 described above. The power generating element 57 is one in which a plurality of single battery layers (single cell) 19, which are each constituted by the positive electrode (positive electrode active material layer) 15, the electrolyte layer 17, and the negative electrode (negative electrode active material layer) 13, is laminated.

Incidentally, the lithium ion secondary battery is not limited to those having a flat shape of a laminate type. The winding type lithium ion secondary battery may be those having a barrel shape or those having a rectangular flat shape obtained by modifying those having a barrel shape, and it is not particularly limited. A laminate film may be used as the outer casing material of those having a barrel shape, and a barrel can (metal can) of the related art may be used, and it is not particularly limited. Preferably, the power generating element is encased with an aluminum laminate film. Weight saving can be attained by such a form.

In addition, the taking out of the tabs 58 and 59 illustrated in FIG. 2 is not particularly limited as well. The positive electrode tab 58 and the negative electrode tab 59 may be taken out from the same side or each of the positive electrode tab 58 and the negative electrode tab 59 may be divided into plural tabs and then taken out from each side, and it is not limited to the form illustrated in FIG. 2. In addition, it is also possible to form a terminal, for example, using a barrel can (metal can) instead of a tab in a winding type lithium ion battery.

A general electric vehicle has a battery storage space of about 170 L. A battery and an auxiliary machine such as a device for controlling charge and discharge are stored in this space, and thus the storage space efficiency of a battery is typically about 50%. The battery loading efficiency into this space is a factor to determine the cruising distance of an electric vehicle. The loading efficiency is impaired as the size of the battery decreases, and thus it is not possible to secure the cruising distance.

Therefore, in the present embodiment, the battery structure of which the power generating element is covered with an outer casing body preferably has a large size. Specifically, it is preferable that the negative electrode active material layer has a rectangle shape (rectangular shape) and the length of the short side of the rectangle is 100 mm or more. Such a large-sized battery can be used in a vehicle use. Herein, the length of the short side of the negative electrode active material layer refers to the length of the shortest side of each electrode. The upper limit of the length of the short side is not particularly limited, but is typically 400 mm or less.

[Volume Energy Density and Rated (Discharge) Capacity]

In consideration of a driving distance (cruising distance) of the electric vehicle per single charge, the volume energy density of the battery is preferably 157 Wh/L or more and the rated capacity is preferably 20 Ah or more.

Herein, an increase in size of a battery is defined from the relation of the battery volume or the battery capacity (rated capacity) as the viewpoint of a large-sized battery that is different from the viewpoint of the physical size of the electrode. Specifically, the non-aqueous electrolyte secondary battery according to the present embodiment is characterized in that a ratio value of a battery volume (a product of a projected area and a thickness of the battery including a battery outer casing body) to a rated capacity of 10 $cm^3$/Ah or less and a rated capacity of 3 Ah or more. This large-sized battery is defined as a battery in which the battery capacity per unit volume is large (10 Ah/$cm^3$ or more), in other words, the battery volume per unit volume (the ratio of the battery volume to the rated capacity) is small (10 $cm^3$/Ah or less), and the battery capacity (rated capacity) is large (3 Ah or more). This is also that a large-sized battery which has a large capacity and expands more largely than ever before is defined by concurrently using the Si material and the carbon material in the negative electrode active material, as it were.

In a case where the ratio value of the battery volume (the product of the projected area and the thickness of the battery including the battery outer casing body) to the rated capacity is more than 10 $cm^3$/Ah, the influence of the variation is small even when the variation occurs since the capacity is small, and as described above, since the problem to be solved by the present invention does not occur in the first place, it can be said that the solving means thereof is not necessary to apply. Incidentally, the ratio value of the battery volume (the product of the projected area and the thickness of the battery including the battery outer casing body) to the rated capacity may be less than 2 $cm^3$/Ah, but expansion is large and the influence of structural collapse other than the variation is significant. In addition, in the present embodiment, the negative electrode active material having a small amount of Si material is used, and it is not easy to increase the battery capacity per unit volume. Further, in a case where the rated capacity is less than 3 Ah, the capacity is small and the influence of the variation is small. In addition, the rated capacity is not sufficient for the large-sized battery.

The upper limit of the ratio value of the battery volume (the product of the projected area and the thickness of the battery including the battery outer casing body) to the rated capacity is preferably 8 $cm^3$/Ah or less. Meanwhile, the lower limit of the ratio value of the battery volume (the product of the projected area and the thickness of the battery including the battery outer casing body) to the rated capacity is not particularly limited, but the lower limit thereof may be 2 $cm^3$/Ah or more and is preferably 3 $cm^3$/Ah or more. Further, the rated capacity is preferably 5 Ah or more, more preferably 10 Ah or more, further preferably 15 Ah or more, and particularly preferably 20 Ah or more, and of them, preferably 25 Ah or more. In this way, a decrease in cycle characteristics caused by the occurrence of the local non-uniformity of reaction with the variation in dispersibility of the binder in a plane of the electrode is observed only by a battery having a large area and a large capacity. On the other hand, in the case of a battery which does not have a large area and a large capacity as described above, such as a consumer battery of the related art, a decrease in cycle characteristics caused by the occurrence of the local non-uniformity of reaction according to the variation is not observed even when there is the variation in dispersibility of the binder in a plane of the electrode.

The rated capacity of the battery is calculated as follows.

<<Measurement of Rated Capacity>>

An electrolyte solution is injected to a testing battery, and then maintained for about 10 hours. Thereafter, the rated capacity is measured by the following procedures 1 to 5 at a temperature of 25° C. and in a voltage range of 3.0 V to 4.15 V. Incidentally, regarding a commercially available battery (product), since 10 hours or longer lapses after injection of the electrolyte solution, the rated capacity may be obtained by performing the following procedures 1 to 5.

Procedure 1: After the voltage reaches 4.15 V at a constant current charge of 0.1 C, rest for 5 minutes.

Procedure 2: Following the procedure 1, charge for 1.5 hours at a constant voltage charge, and rest for 5 minutes.

Procedure 3: After the voltage reaches 3.0 V by a constant current discharge of 0.1 C, discharge for 2 hours at a constant voltage discharge, and then rest for 10 seconds.

Procedure 4: After the voltage reaches 4.1 V by a constant current charge of 0.1 C, charge for 2.5 hours at a constant voltage charge, and then rest for 10 seconds.

Procedure 5: After the voltage reaches 3.0 V by a constant current discharge of 0.1 C, discharge for 2 hours at a constant voltage discharge, and then stop for 10 seconds.

Rated capacity: Discharge capacity in discharge from constant current discharge to constant voltage discharge (CCCV discharge capacity) in the procedure 5 is regarded as the rated capacity.

The battery volume is calculated from the product of the projected area and the thickness of the battery including the battery outer casing body. Of them, regarding the projected area of the battery including the battery outer casing body, six projected areas of the front surface, the rear surface, the right lateral surface, the left lateral surface, the planar surface, and the bottom surface of the battery are obtained, but it is sufficient to use the largest projected area of the battery of these projected areas, and in general, the projected area is the projected area of the planar surface or bottom surface of the battery when the battery is placed on a flat plate in the most stable state. In addition, regarding the thickness of the battery including the battery outer casing body, the thickness at the time of full charge is measured. Further, since the thickness of the battery including the battery outer casing body is a large area, thicknesses at eight sites or more are measured and a value obtained by averaging the thicknesses is used in consideration of a variation caused by measurement sites. For example, in Examples, the thicknesses of the battery including the battery outer casing body at sites indicated by number symbols 1 to 9 illustrated in FIG. 2 or in the vicinity thereof are measured and a value obtained by averaging the thicknesses is used.

Further, the aspect ratio of a rectangular electrode is preferably 1 to 3 and more preferably 1 to 2. Incidentally, the aspect ratio of the electrode is defined as the length/width ratio of a positive electrode active material layer with a rectangular shape. When the aspect ratio is in this range, an advantage of having both the performance required for a vehicle and mounting space can be achieved.

<Method for Producing Lithium Ion Secondary Battery>

The method for producing a lithium ion secondary battery is not particularly limited, and the lithium ion secondary battery may be produced by a known method. Specifically, the method includes (1) fabrication of electrodes, (2) fabrication of the single battery layer, (3) fabrication of the power generating element, and (4) production of the laminate type battery. Hereinafter, the method for producing a lithium ion secondary battery will be described by taking an example but is not limited thereto.

(1) Fabrication of Electrodes (Positive Electrode and Negative Electrode)

The electrode (positive electrode or negative electrode) may be fabricated, for example, by preparing an active material slurry (positive electrode active material slurry or negative electrode active material slurry), coating the active material slurry on a current collector, and drying and then pressing the resultant product. The active material slurry contains the active material (positive electrode active material or negative electrode active material) described above, a binder (in the case of using an aqueous binder at the negative electrode side, it is desirable to concurrently use a thickener), a conductive aid, and a solvent. Herein, in order to control a variation in dispersibility of the binder in a plane of the negative electrode active material layer, mainly, a vibration time, an ultrasonic wavelength, or the like when stirring is performed using ultrasonic vibration at the time of producing the negative electrode active material (water-based) slurry may be changed to adjust the variation. In addition, mainly, a dispersing (mixing under stirring) time or the like at the time of producing the negative electrode active material (water-based) slurry may be changed to adjust the variation. Alternatively, for example, mainly, the type of a dispersing mixer may be changed to adjust the variation, and thus there is no particular limitation. In addition, in order to control a variation in dispersibility of pores in a plane of the negative electrode active material layer, mainly, a dispersing time or the number of rotations at the time of producing the slurry may be changed to adjust the variation. In addition thereto, for example, mainly, the type of a dispersing mixer or a drying rate after electrode coating may be changed to adjust the variation, and thus there is no particular limitation.

The solvent is not particularly limited, and N-methyl-2-pyrrolidone (NMP), dimethyl formamide, dimethyl acetamide, methyl formamide, cyclohexane, hexane, water, and the like may be used.

The method for coating the active material slurry on the current collector is not particularly limited, and examples thereof include a screen printing method, a spray coating method, an electrostatic spray coating method, an ink jet method, and a doctor blade method.

The method for drying the coating film formed on the surface of the current collector is not particularly limited as long as at least a part of the solvent in the coating film is removed. Examples of the drying method include heating. The drying conditions (drying time, drying temperature, and the like) may be appropriately set depending on the volatilization rate of the solvent contained in the active material slurry to be applied, the coating amount of the active material slurry, and the like. Incidentally, a part of the solvent may remain. The remaining solvent may be removed in the pressing process or the like described below.

The pressing means is not particularly limited, and for example, a calendar roll, a flat press, and the like may be used.

(2) Fabrication of Single Battery Layer

The single battery layer may be fabricated by laminating the electrodes (positive electrode and negative electrode) fabricated in (1) via a separator (electrolyte layer).

(3) Fabrication of Power Generating Element

The power generating element may be fabricated by laminating the single battery layers in appropriate consideration of the output and capacity of the single battery layer, and the output, capacity, and the like that are required for a battery.

(4) Production of Laminate Type Battery

As the configuration of the battery, it is possible to employ various kinds of shapes such as a square shape, a paper type, a laminate type, a cylindrical type, and a coin type. In addition, the current collector, an insulating plate, and the like of the constituent components are not particularly limited and may be selected according to the above shape. However, a laminate type battery is preferable in the present embodiment. In the laminate type battery, the lead is joined to the current collector of the power generating element obtained above and this positive electrode lead or negative electrode lead is joined to the positive electrode tab or the negative electrode tab. Thereafter, the power generating element is introduced into the laminate sheet such that the positive electrode tab and the negative electrode tab are exposed to the outside of the battery, the electrolyte solution is injected by an injecting machine, and the laminate sheet is sealed in a vacuum, such that the laminate type battery can be produced.

(5) Activation Treatment or the Like

In the present embodiment, from the viewpoint of improving performance and durability of the laminate type battery obtained above, an initial charge treatment, a gas removing treatment, an activation treatment, and the like may be further performed under the following conditions as necessary. In this case, in order to be able to perform the gas removing treatment, in the above (4) Production of laminate type battery, three sides of the laminate sheet (outer casing material) are completely sealed (main sealing) at the time of sealing by thermocompression bonding into a rectangular shape, and the remaining one side is temporarily sealed by thermocompression bonding. The remaining one side may be freely opened or closed, for example, by clipping or the like. However, it is preferable to temporarily seal the one side by thermocompression bonding from the viewpoint of mass production (production efficiency). This is because this case only requires adjusting the temperature and the pressure for bonding. In a case where the side is temporarily sealed by thermocompression bonding, the side can be unsealed by applying a slight pressure. After degassing, the side may be temporarily sealed again by thermocompression bonding. Finally, the side can be completely sealed (main sealing) by thermocompression bonding.

(Initial Charge Treatment)

It is preferable to perform an aging treatment (initial charge treatment) of the battery as follows. Charging is performed at 25° C. at 0.05 C for 4 hours (SOC: about 20%) by a constant current charging method. Subsequently, the battery is charged at 25° C. with a rate of 0.1 C to 4.45 V. Thereafter, charging is stopped, and the battery is allowed to stand in the state (SOC: about 70%) for about 2 days (48 hours).

(Initial (First) Gas Removing Treatment)

Next, as the initial (first) gas removing treatment, the following treatment is performed. First, the one side temporarily sealed by thermocompression bonding is unsealed. Gas is removed at 10±3 hPa for 5 minutes. Thereafter, the one side is subjected to thermocompression bonding again to perform temporary sealing. In addition, pressure molding (contact pressure: 0.5±0.1 MPa) is performed using a roller to make the electrode adhere to the separator sufficiently.

(Activation Treatment)

Next, as the activation treatment method, the following electrochemical pretreatment method is performed.

First, two cycles of charging at 25° C. at 0.1 C until the voltage becomes 4.45 V by a constant current charging method and then discharging at 0.1 C to 2.0 V are performed. Similarly, one cycle of charging at 25° C. at 0.1 C until the voltage becomes 4.45 V by a constant current charging method and then, discharging at 0.1 C to 2.0 V, and one cycle of charging at 0.1 C until the voltage becomes 4.65 V and then discharging at 0.1 C to 2.0 V are performed. Furthermore, one cycle of charging at 25° C. at 0.1 C until the voltage becomes 4.75 V by a constant current charging method and then discharging at 0.1 C to 2.0 V may be performed.

Incidentally, Herein, as the activation treatment method, an electrochemical pretreatment method in which the constant current charging method is used and the voltage is used as a stop condition has been described as an example. However, as the charging method, a constant current constant voltage charging method may be used. In addition to the voltage, an amount of electric charge or time may be employed as the stop condition.

(Last (Second) Gas Removing Treatment)

Next, as the last (second) gas removing treatment, the following treatment is performed. First, the one side temporarily sealed by thermocompression bonding is unsealed. Gas is removed at 10±3 hPa for 5 minutes. Thereafter, the one side is subjected to thermocompression bonding again to perform main sealing. Further, pressure molding (contact pressure: 0.5±0.1 MPa) is performed using a roller to make the electrode adhere to the separator sufficiently.

In the present embodiment, it is possible to enhance performance and durability of the obtained battery by performing the above-described initial charge treatment, gas removing treatment, and activation treatment.

[Assembled Battery]

An assembled battery is constituted by connecting plural batteries. Specifically, the assembled battery is one which is constituted by connecting at least two or more batteries in series, in parallel, or in series and parallel. It is possible to freely control the capacity and voltage by connecting the batteries in series and in parallel.

It is also possible to form a detachable small-size assembled battery by connecting plural batteries in series or in parallel. Moreover, by further connecting plural detachable small-size assembled batteries in series or parallel, it is possible to form an assembled battery having a high capacity and a high output which is suitable as a power source or auxiliary power source for driving a vehicle requiring a high volume energy density and a high volume output density. The number of the connected batteries for fabricating an assembled battery or the number of the stacked small-size assembled batteries for fabricating an assembled battery having a high capacity may be determined depending on the capacity or output of the battery that is mounted to a vehicle (electric vehicle).

[Vehicle]

The non-aqueous electrolyte secondary battery of the present invention including the lithium ion secondary battery according to the present embodiment can maintain a discharge capacity even being used for a long period of time and thus exhibits favorable cycle characteristics. Furthermore, the non-aqueous electrolyte secondary battery has a high volume energy density. For use in a vehicle such as an electric vehicle, a hybrid electric vehicle, a fuel cell vehicle, or a hybrid fuel cell vehicle, a long lifespan is required as well as a high capacity and a large size as compared with use in an electric and mobile electronic device. Therefore, the lithium ion secondary battery (non-aqueous electrolyte secondary battery) can be suitably used as a power source for a vehicle, for example, as a power source or auxiliary power source for driving a vehicle.

Specifically, the battery or the assembled battery formed by combining plural batteries can be mounted on a vehicle. In the present invention, a battery exhibiting excellent long term reliability, output characteristics, and a long lifespan can be formed, and thus, by mounting such a battery, a plug-in hybrid electric vehicle having a long EV driving distance and an electric vehicle having a long driving distance per one charge can be constituted. This is because a vehicle having a long lifespan and high reliability can be provided as the battery or the assembled battery formed by combining plural batteries is used in, for example, a vehicle such as a hybrid car, a fuel cell vehicle, or an electric vehicle (including a two-wheel vehicle (motor bike) or a three-wheel vehicle in addition to all four-wheel vehicles (a passenger vehicle, a truck, a commercial vehicle such as a bus, a compact car, or the like)). However, the use is not limited to a vehicle, and the battery can be applied to various kinds of power sources of other vehicles, for example, a moving object such as an electric train, and it can also be utilized as a built-in power source of an uninterruptable power source unit.

EXAMPLES

Hereinafter, the present invention will be described in more detail using Examples and Comparative Examples, but the present invention is not limited only to the following Examples in any way.

1. Fabrication of Positive Electrode

A positive electrode active material slurry was prepared by mixing 94% by mass of NMC composite oxide as the positive electrode active material, 3% by mass of acetylene black as the conductive aid, 3% by mass of polyvinylidene fluoride (PVDF) as the binder, and an appropriate amount of N-methyl-2-pyrrolidone (NMP) as a slurry viscosity adjusting solvent. The obtained positive electrode active material slurry was applied to the surface of an aluminum foil (thickness: 20 μm) as the positive electrode current collector, dried for 3 minutes at 120° C., and subjected to compression molding using a roll press machine, thereby fabricating a positive electrode active material layer having a planar shape of a rectangle. The positive electrode active material layer was also formed on the back surface of the aluminum foil in the same manner, thereby fabricating a positive electrode having a positive electrode active material layer formed on both surfaces of a positive electrode current collector (aluminum foil). Incidentally, the coating amount of the positive electrode active material layer on one surface was 24 mg/cm$^2$ (not including foil). Further, the density of the positive electrode active material layer was 3.5 g/cm$^3$ (not including foil). Furthermore, the aspect ratio of the electrode (a length/width ratio of the rectangular positive electrode active material layer) was 1.3.

KUREHA KF Polymer, powder type, Grade No. W#7200 manufactured by Kureha Battery Materials Japan Co., Ltd. was used as the PVDF. Further, a NMC composite oxide having a composition represented by LiNi$_{0.5}$Mn$_{0.3}$Co$_{0.2}$O$_2$ (average particle diameter: 15 μm) was used as the NMC composite oxide. An NMC composite oxide in which, applying this to the General Formula (1): Li$_a$Ni$_b$Mn$_c$Co$_d$M$_x$O$_2$, a=1, b=0.5, c=0.3, d=0.2, x=0, and b+c+d=1 are satisfied, and which satisfies the requirement of the General Formula 1 was used. This NMC composite oxide was prepared by the following preparation method.

(Preparation of NMC Composite Oxide)

To an aqueous solution (1 mol/L) having nickel sulfate, cobalt sulfate, and manganese sulfate dissolved therein, sodium hydroxide and ammonia were continuously supplied at 60° C. to adjust the pH to 11.3, and according to a co-precipitation method, metal composite hydroxide in which nickel, manganese, and cobalt are dissolved at a molar ratio of 50:30:20 was produced.

The metal composite hydroxide and lithium carbonate were weighed such that the ratio of the total mole number of metals (Ni, Mn, and Co) other than Li to the mole number of Li was 1:1, and then sufficiently mixed. The temperature was increased at a temperature increase rate of 5° C./min, temporary calcination was performed at 900° C. for 2 hours in air atmosphere, the temperature was then increased at a temperature increase rate 3° C./min, and main calcination was performed at 920° C. for 10 hours. After cooling to room temperature, a NMC composite oxide as a positive electrode active material having a composition of LiNi$_{0.5}$Mn$_{0.3}$Co$_{0.2}$O$_2$ was obtained. Incidentally, the average secondary particle diameter of the obtained NMC composite oxide was 10 μm.

2. Fabrication of Negative Electrode 2.1. Fabrication of Negative Electrodes of Comparative Example 1-1 to Comparative Example 1-7

Adjustment was performed by using styrene-butadiene rubber (SBR) as the binder and changing the dispersing (mixing under stirring) time at the time of fabricating the negative electrode active material (water-based) slurry or the rotational speed in fabrication of a negative electrode having a different dispersibility of the SBR (and dispersibility of pores). In this way, negative electrodes in which the variation in dispersibility of SBR as a binder (and the variation in dispersibility of pores) are changed as shown in Table 1 were fabricated. Hereinafter, each Comparative Example will be described below.

Incidentally, the "variation in dispersibility of SBR as a binder" refers to a difference between the maximum value and the minimum value of an area proportion (%) of a binder (SBR) in an area of the field of view of each image (five sites) of cross-sections of the negative electrode active material layer in a case where a plurality of arbitrary places in a plane of the negative electrode active material layer (herein, five sites in a place illustrated in FIG. 3) is selected.

Herein, places obtained by equally dividing a diagonal line (dashed-dotted line) in a plane of the negative electrode active material layer into six illustrated in the FIG. 3A (places marked with number symbols 1 to 5 in the FIG. 3A) were selected, and the negative electrode was subjected to cross-section processing by an arbitrary cross-section processing method along the diagonal line (dashed-dotted line) in a plane of the negative electrode active material layer illustrated in the FIG. 3A (cross-section is illustrated in the FIG. 3B). Next, according to a method described later (calculation method of the area proportion of the binder), the area proportion (%) of the binder (SBR) in each image in the area of the field of view of each image of cross-sections of the cut negative electrode active material layer was calculated, and a difference between the maximum value and the minimum value of the area proportion (%) of binder (SBR) in each image of these five sites was obtained. In the following Tables 1 to 3 and the like, the difference between the maximum value and the minimum value of the area proportion (%) of binder (SBR) in each image of these five sites is also simply referred to as "binder distribution (%)."

As for "each image of cross-sections of the negative electrode active material layer" described above, reflection electron images obtained by observing, with an electron microscope, five sites marked with number symbols 1 to 5 in the FIG. 3B corresponding to places of number symbols 1 to 5 in the FIG. 3A and the vicinities thereof (shaded portions in the drawing) were used. Further, the "area of the field of view in each image of cross-sections of the negative electrode active material layer" refers to a whole area (whole field of view) of the reflection electron images obtained by observing, with an electron microscope, five sites illustrated in the FIG. 3B and vicinities thereof (shaded portions in the drawing) (an area of a rectangular in which the vertical side is the thickness of the negative electrode active material layer and the horizontal side is 100 μm).

The area proportion (%) of the binder (SBR) in the cross-section of the negative electrode active material layer was obtained by a method described later (calculation method of the area proportion of the binder). That is, Os was added to the binder (SBR) in the cross-section of the negative electrode active material layer. Thereafter, reflection electron images obtained by observing, with an electron microscope, cross-sectional portions corresponding to five sites of the FIG. 3A in a plane of the negative electrode active material layer (five shaded portions of the FIG. 3B) were binarized with a threshold for distinguishing the binder added with Os and a site other than the binder, and then the area proportion was calculated. Specifically, a secondary electron image or a reflection electron image was captured using Os with an electron microscope, and then image processing software was used with respect to the image. As the image processing software, AxioVision manufactured by Carl Zeiss AG, WinROOF manufactured by MITANI CORPORATION, and Image-Pro manufactured by Media Cybernetics were used. In the binarization processing, by setting an appropriate threshold by which contrast between the binder added with Os and a site other than the binder may be distinguished, the amount of area of the binder in the area of the field of view of each image (five sites) of cross-sections of the negative electrode active material layer was calculated.

Further, the "variation in dispersibility of pores" refers to a difference between a maximum value and a minimum value of an area proportion (%) of pores in each image (five sites) of cross-sections of the negative electrode active material layer in a case where a plurality of arbitrary places in a plane of the negative electrode active material layer (herein, five sites in a place illustrated in the FIG. 3) is selected.

Herein, places obtained by equally dividing a diagonal line (dashed-dotted line) in a plane of the negative electrode active material layer into six illustrated in the FIG. 3A (places marked with number symbols 1 to 5 in the FIG. 3A) are selected, and the negative electrode is subjected to cross-section processing by an arbitrary cross-section processing method along the diagonal line (dashed-dotted line) in a plane of the negative electrode active material layer illustrated in the FIG. 3A (cross-section is illustrated in FIG. 3B). Next, according to the following method (calculation method of the area proportion of pores), the area proportion (%) of pores in each image of cross-sections of the cut negative electrode active material layer was calculated, and a difference between the maximum value and the minimum value of the area proportion (%) of pores in each image of these five sites was obtained. In the following Tables 1 to 3 and the like, the difference between the maximum value and the minimum value of the area proportion (%) of pores in each image of these five sites is also simply referred to as "pore distribution (%)."

As for "each image of cross-sections of the cut negative electrode active material layer" described above, electron images obtained by observing, with an electron microscope, five sites marked with number symbols 1 to 5 in the FIG. 3B corresponding to places of number symbols 1 to 5 in the FIG. 3A and the vicinities thereof (shaded portions in the drawing) (image size: an area of a rectangular in which the vertical side is the thickness of the negative electrode active material layer and the horizontal side is 100 μm) were used.

The area proportion (%) of pores in each image of cross-sections of the negative electrode active material layer was obtained by a method described later (calculation method of the area proportion of pores). That is, reflection electron images obtained by observing, with an electron microscope, cross-sectional portions corresponding to five sites of the FIG. 3A in a plane of the negative electrode active material layer (five shaded portions of the FIG. 3B) were binarized with a threshold for distinguishing the pore and a solid portion other than the pore, and then the area proportion was calculated. Specifically, a secondary electron image or a reflection electron image was captured with an electron microscope, and image processing software was used with respect to the image. As the image processing software, AxioVision manufactured by Carl Zeiss AG, WinROOF manufactured by MITANI CORPORATION, and Image-Pro manufactured by Media Cybernetics were used. In the binarization processing, by setting an appropriate threshold by which contrast between the solid portion and the pore may be distinguished, the amount of area of the pore in the area of each image (five sites) of cross-sections of the negative electrode active material layer was calculated.

Fabrication of Negative Electrode of Comparative Example 1-1

96% by mass of natural graphite as the negative electrode active material, 1% by mass of carbon black as the conductive aid, 2% by mass of SBR as the binder, and 1% by mass of sodium salt of carboxymethyl cellulose (referred to as Na salt of CMC) were prepared. A negative electrode active material (water-based) slurry was prepared in such a manner that these were added into purified water, mixed under stirring using a stirring and defoaming apparatus for 4 minutes at a rotational speed of 2000 rpm, and (sufficiently) dispersed. Incidentally, Super-P (registered trademark) manufactured by Imerys Graphite & Carbon was used as carbon black. Further, a latex of styrene-butadiene rubber was used as the binder, and the content of styrene-butadiene rubber (SBR) of the solid content in the latex was set to 2% by mass.

The negative electrode active material (water-based) slurry was applied to a copper foil (thickness: 10 μm) as the negative electrode current collector, dried for 3 minutes at 120° C., and subjected to compression molding using a roll press machine, thereby fabricating a negative electrode. The negative electrode active material layer was also formed on the back surface of the copper foil in the same manner, thereby fabricating a negative electrode having a negative electrode active material layer formed on both surfaces of the negative electrode current collector (copper foil). Incidentally, the coating amount of the negative electrode active material layer on one surface was 9 mg/cm$^2$ (not including foil). That is, the coating amount of the negative electrode active material layer on one surface was adjusted such that the A/C ratio between facing positive electrodes was 1.20 at the time of fabricating a battery described later. Further, the density of the negative electrode active material layer was 1.5 g/cm$^3$ (not including foil). Furthermore, applying the negative electrode active material layer to Formula (1): α (Si material)+β (carbon material), the Si material is not used, the carbon material is natural graphite, α+β=96, α=0, and β=96 are satisfied, and the requirement of Formula (1) is not satisfied. Incidentally, the average particle diameter of natural graphite as the carbon material was 24 μm.

Fabrication of Negative Electrode of Comparative Example 1-2

A negative electrode of Comparative Example 1-2 was fabricated in the same manner as in the Comparative Example 1-1, except that, in the Comparative Example 1-1, the dispersing (mixing under stirring) time at the time of fabricating the negative electrode active material (water-based) slurry was changed from 4 minutes to 2 minutes. Further, the density of the negative electrode active material layer constituting the negative electrode of the Comparative Example 1-2 was 1.5 g/cm³ (not including foil).

Fabrication of Negative Electrode of Comparative Example 1-3

A negative electrode of Comparative Example 1-3 was fabricated in the same manner as in the Comparative Example 1-1, except that, in the Comparative Example 1-1, the dispersing (mixing under stirring) time at the time of fabricating the negative electrode active material (water-based) slurry was changed from 4 minutes to 1.5 minutes. Further, the density of the negative electrode active material layer constituting the negative electrode of the Comparative Example 1-3 was 1.5 g/cm³ (not including foil).

Fabrication of Negative Electrode of Comparative Example 1-4

A negative electrode of Comparative Example 1-4 was fabricated in the same manner as in the Comparative Example 1-2. Further, the density of the negative electrode active material layer constituting the negative electrode of the Comparative Example 1-4 was 1.5 g/cm³ (not including foil).

Fabrication of Negative Electrode of Comparative Example 1-5

A negative electrode of Comparative Example 1-5 was fabricated in the same manner as in the Comparative Example 1-3. Further, the density of the negative electrode active material layer constituting the negative electrode of the Comparative Example 1-5 was 1.5 g/cm³ (not including foil).

Fabrication of Negative Electrode of Comparative Example 1-6

A negative electrode of Comparative Example 1-6 was fabricated in the same manner as in the Comparative Example 1-1, except that, in the Comparative Example 1-1, the dispersing (mixing under stirring) time at the time of fabricating the negative electrode active material (water-based) slurry was changed from 4 minutes to 3 minutes. Further, the density of the negative electrode active material layer constituting the negative electrode of the Comparative Example 1-6 was 1.5 g/cm³ (not including foil).

2.2. Fabrication of Negative Electrodes of Comparative Examples 2-1 to 2-7 and Examples 2-1 to 2-6

In the fabrication of a negative electrode having a different dispersibility of SBR as the binder and a different dispersibility of pores, the dispersibility of SBR as the binder was adjusted by mainly changing the dispersing (mixing under stirring) time at the time of fabricating the negative electrode active material (water-based) slurry. Further, the dispersibility of pores was adjusted by mainly changing the dispersing time and the number of rotations at the time of dispersing. In this way, negative electrodes in which the variation in dispersibility of SBR as the binder and the variation in dispersibility of pores were changed as shown in Table 2 were fabricated. Incidentally, the calculation methods of the variation in dispersibility of SBR and the variation in dispersibility of pores are as described in the section "2.1. Fabrication of Negative Electrodes of Comparative Example 1-1 to Comparative Example 1-7." Hereinafter, each Comparative Example will be described below.

Fabrication of Negative Electrode of Comparative Example 2-1

86.4% by mass of natural graphite and 9.6% by mass of Si—Ti alloy as the negative electrode active material, 1% by mass of carbon black as the conductive aid, 2% by mass of SBR as the binder, and 1% by mass of Na salt of CMC as the thickener were prepared. A negative electrode active material (water-based) slurry was prepared in such a manner that these were added into purified water, mixed under stirring using a mixer manufactured by THINKY CORPORATION for 4 minutes at a rotational speed of 2000 rpm, and (sufficiently) dispersed. Incidentally, Super-P (registered trademark) manufactured by Imerys Graphite & Carbon was used as carbon black. Further, the average particle diameter of natural graphite was 20 m.

Further, as the Si—Ti alloy, an alloy having a composition represented by $Si_{90}Ti_{10}$ (unit: % by mass) was used. This Si—Ti alloy was produced by a mechanical alloying method. Specifically, by using a planetary ball mill apparatus P-6 manufactured by Fritsch GmbH, zirconia pulverizing balls and raw material powders of the alloy were put in a zirconia pulverizing pot, alloyed at 600 rpm for 48 hours (alloying treatment), and then subjected to a pulverization treatment at 400 rpm for 1 hour. As the raw material powders of the alloy, metal powders of Si and Ti were used. Incidentally, the average particle diameter of the obtained Si—Ti alloy powder was 1.5 μm. Herein, the alloying treatment is to perform alloying by applying high energy to the raw material powders of the alloy at high rotation (600 rpm). Meanwhile, the pulverization treatment is to perform a treatment of loosening secondary particles at low rotation (400 rpm) (in this treatment, alloying does not occur).

The negative electrode active material (water-based) slurry was applied to a copper foil (thickness: 10 μm) as the negative electrode current collector, dried for 3 minutes at 120° C., and subjected to compression molding using a roll press machine, thereby fabricating a negative electrode. The negative electrode active material layer was also formed on the back surface of the copper foil in the same manner, thereby fabricating a negative electrode having a negative electrode active material layer formed on both surfaces of the negative electrode current collector (copper foil). Incidentally, the coating amount of the negative electrode active material layer on one surface was 7 mg/cm² (not including foil). That is, the coating amount of the negative electrode active material layer on one surface was adjusted such that the A/C ratio between facing positive electrodes was 1.20 at the time of fabricating a battery described later. Further, the density of the negative electrode active material layer was 1.6 g/cm³ (not including foil). Furthermore, applying the negative electrode active material layer to Formula (1): α (Si material)+β (carbon material), the Si material is the Si—Ti alloy, the carbon material is natural graphite, α+β=96, α=9.6, β=86.4 are satisfied, and the requirement of Formula (1) is satisfied. Incidentally, the average particle diameter of natural graphite as the carbon material was 24 μm. The average particle diameter of the Si—Ti alloy powder as the Si material was 1.5 μm.

Fabrication of Negative Electrode of Comparative Example 2-2

A negative electrode of Comparative Example 2-2 was fabricated in the same manner as in the Comparative Example 2-1, except that, in the Comparative Example 2-1, the dispersing (mixing under stirring) time at the time of fabricating the negative electrode active material (water-based) slurry was changed from 4 minutes to 2 minutes. Further, the density of the negative electrode active material layer constituting the negative electrode of the Comparative Example 2-2 was 1.6 g/cm$^3$ (not including foil).

Fabrication of Negative Electrode of Comparative Example 2-3

A negative electrode of Comparative Example 2-3 was fabricated in the same manner as in the Comparative Example 2-1, except that, in the Comparative Example 2-1, the dispersing (mixing under stirring) time at the time of fabricating the negative electrode active material (water-based) slurry was changed from 4 minutes to 1.5 minutes. Further, the density of the negative electrode active material layer constituting the negative electrode of the Comparative Example 2-3 was 1.6 g/cm$^3$ (not including foil).

Fabrication of Negative Electrode of Comparative Example 2-4

A negative electrode of Comparative Example 2-4 was fabricated in the same manner as in the Comparative Example 2-3. Further, the density of the negative electrode active material layer constituting the negative electrode of the Comparative Example 2-4 was 1.6 g/cm$^3$ (not including foil).

Fabrication of Negative Electrode of Comparative Example 2-5

A negative electrode of Comparative Example 2-5 was fabricated in the same manner as in the Comparative Example 2-1, except that, in the Comparative Example 2-1, the dispersing (mixing under stirring) time at the time of fabricating the negative electrode active material (water-based) slurry was changed from 4 minutes to 1 minute. Further, the density of the negative electrode active material layer constituting the negative electrode of the Comparative Example 2-5 was 1.6 g/cm$^3$ (not including foil).

Fabrication of Negative Electrode of Example 2-1

A negative electrode of Example 2-1 was fabricated in the same manner as in the Comparative Example 2-1. Further, the density of the negative electrode active material layer constituting the negative electrode of the Example 2-1 was 1.6 g/cm$^3$ (not including foil).

Fabrication of Negative Electrode of Example 2-2

A negative electrode of Example 2-2 was fabricated in the same manner as in the Comparative Example 2-2. Further, the density of the negative electrode active material layer constituting the negative electrode of the Example 2-2 was 1.6 g/cm$^3$ (not including foil).

Fabrication of Negative Electrode of Example 2-3

A negative electrode of Example 2-3 was fabricated in the same manner as in the Comparative Example 2-1, except that, in the Comparative Example 2-1, the rotational speed at the time of dispersing was changed from 2000 rpm to 1500 rpm while the dispersing (mixing under stirring) time at the time of fabricating the negative electrode active material (water-based) slurry was maintained to 4 minutes. Further, the density of the negative electrode active material layer constituting the negative electrode of the Example 2-3 was 1.6 g/cm$^3$ (not including foil).

Fabrication of Negative Electrode of Example 2-4

A negative electrode of Example 2-4 was fabricated in the same manner as in the Comparative Example 2-1, except that, in the Comparative Example 2-1, the dispersing (mixing under stirring) time at the time of fabricating the negative electrode active material (water-based) slurry was changed from 4 minutes to 6 minutes and the rotational speed at the time of dispersing was changed from 2000 rpm to 1000 rpm. Further, the density of the negative electrode active material layer constituting the negative electrode of the Example 2-4 was 1.6 g/cm$^3$ (not including foil).

Fabrication of Negative Electrode of Example 2-5

A negative electrode of Example 2-5 was fabricated in the same manner as in the Comparative Example 2-1, except that, in the Comparative Example 2-1, the dispersing (mixing under stirring) time at the time of fabricating the negative electrode active material (water-based) slurry was changed from 4 minutes to 2 minutes and the rotational speed at the time of dispersing was changed from 2000 rpm to 1500 rpm. Further, the density of the negative electrode active material layer constituting the negative electrode of the Example 2-5 was 1.6 g/cm$^3$ (not including foil).

Fabrication of Negative Electrode of Example 2-6

A negative electrode of Example 2-6 was fabricated in the same manner as in the Comparative Example 2-1, except that, in the Comparative Example 2-1, the dispersing (mixing under stirring) time at the time of fabricating the negative electrode active material (water-based) slurry was changed from 4 minutes to 2 minutes and the rotational speed at the time of dispersing was changed from 2000 rpm to 1000 rpm. Further, the density of the negative electrode active material layer constituting the negative electrode of the Example 2-6 was 1.6 g/cm$^3$ (not including foil).

Fabrication of Negative Electrode of Comparative Example 2-6

A negative electrode of Comparative Example 2-6 was fabricated in the same manner as in the Comparative Example 2-1, except that, in the Comparative Example 2-1, the dispersing (mixing under stirring) time at the time of fabricating the negative electrode active material (water-based) slurry was changed from 4 minutes to 1 minute and the rotational speed at the time of dispersing was changed from 2000 rpm to 1000 rpm. Further, the density of the negative electrode active material layer constituting the negative electrode of the Comparative Example 2-6 was 1.6 g/cm$^3$ (not including foil).

Fabrication of Negative Electrode of Comparative Example 2-7

A negative electrode of Comparative Example 2-7 was fabricated in the same manner as in the Comparative Example 2-6. Further, the density of the negative electrode active material layer constituting the negative electrode of the Comparative Example 2-7 was 1.6 g/cm$^3$ (not including foil).

2.3. Fabrication of Negative Electrodes of Comparative Examples 3-1 to 3-7 and Examples 3-1 to 3-6

In the fabrication of a negative electrode having a different dispersibility of SBR as the binder and a different dispersibility of pores, the dispersibility of SBR as the binder was adjusted by mainly changing the dispersing (mixing under stirring) time at the time of fabricating the negative electrode active material (water-based) slurry. Further, the dispersibility of pores was adjusted by mainly changing the dispersing time and the number of rotations at the time of dispersing. In this way, negative electrodes in which the variation in dispersibility of SBR as the binder and the variation in dispersibility of pores are changed as shown in Table 3 were fabricated. Incidentally, the calculation methods of the variation in dispersibility of SBR and the variation in dispersibility of pores are as described in the section "2.1. Fabrication of Negative Electrodes of Comparative Example 1-1 to Comparative Example 1-7." Hereinafter, each Comparative Example will be described below.

Fabrication of Negative Electrode of Comparative Example 3-1

A negative electrode active material (water-based) slurry was fabricated in the same manner as in the Comparative Example 2-1, except that the composition of the negative electrode was set to 76.8% by mass of natural graphite and 19.2% by mass of Si—Ti alloy as the negative electrode active materials, 1% by mass of carbon black as the conductive aid, 2% by mass of SBR as the binder, and 1% by mass of ammonia salt of CMC as the thickener.

The negative electrode active material (water-based) slurry was applied to a copper foil (thickness: 10 μm) as the negative electrode current collector, dried for 3 minutes at 120° C., and subjected to compression molding using a roll press machine, thereby fabricating a negative electrode. The negative electrode active material layer was also formed on the back surface of the copper foil in the same manner, thereby fabricating a negative electrode having a negative electrode active material layer formed on both surfaces of the negative electrode current collector (copper foil). Incidentally, the coating amount of the negative electrode active material layer on one surface was 6.5 mg/cm$^2$ (not including foil). That is, the coating amount of the negative electrode active material layer on one surface was adjusted such that the A/C ratio between facing positive electrodes was 1.20 at the time of fabricating a battery described later. Further, the density of the negative electrode active material layer was 1.63 g/cm$^3$ (not including foil). Furthermore, applying the negative electrode active material layer to Formula (1): α (Si material)+β (carbon material), the Si material is the Si—Ti alloy, the carbon material is natural graphite, α+β=96, α=19.2, and β=76.8 are satisfied, and the requirement of Formula (1) is satisfied. Incidentally, the average particle diameter of natural graphite as the carbon material was 24 m. The average particle diameter of the Si—Ti alloy powder as the Si material was 1.5 μm.

Fabrication of Negative Electrode of Comparative Example 3-2

A negative electrode of Comparative Example 3-2 was fabricated in the same manner as in the Comparative Example 3-1, except that, in the Comparative Example 3-1, the dispersing (mixing under stirring) time at the time of fabricating the negative electrode active material (water-based) slurry was changed from 4 minutes to 2 minutes. Further, the density of the negative electrode active material layer constituting the negative electrode of the Comparative Example 3-2 was 1.63 g/cm$^3$ (not including foil).

Fabrication of Negative Electrode of Comparative Example 3-3

A negative electrode of Comparative Example 3-3 was fabricated in the same manner as in the Comparative Example 3-1, except that, in the Comparative Example 3-1, the dispersing (mixing under stirring) time at the time of fabricating the negative electrode active material (water-based) slurry was changed from 4 minutes to 1.5 minutes. Further, the density of the negative electrode active material layer constituting the negative electrode of the Comparative Example 3-3 was 1.63 g/cm$^3$ (not including foil).

Fabrication of Negative Electrode of Comparative Example 3-4

A negative electrode of Comparative Example 3-4 was fabricated in the same manner as in the Comparative Example 3-3. Further, the density of the negative electrode active material layer constituting the negative electrode of the Comparative Example 3-4 was 1.63 g/cm$^3$ (not including foil).

Fabrication of Negative Electrode of Comparative Example 3-5

A negative electrode of Comparative Example 3-5 was fabricated in the same manner as in the Comparative Example 3-1, except that, in the Comparative Example 3-1, the dispersing (mixing under stirring) time at the time of fabricating the negative electrode active material (water-based) slurry was changed from 4 minutes to 1 minute. Further, the density of the negative electrode active material layer constituting the negative electrode of the Comparative Example 3-5 was 1.63 g/cm$^3$ (not including foil).

Fabrication of Negative Electrode of Example 3-1

A negative electrode of Example 3-1 was fabricated in the same manner as in the Comparative Example 3-1. Further, the density of the negative electrode active material layer constituting the negative electrode of the Example 3-1 was 1.63 g/cm$^3$ (not including foil).

Fabrication of Negative Electrode of Example 3-2

A negative electrode of Example 3-2 was fabricated in the same manner as in the Comparative Example 3-2. Further, the density of the negative electrode active material layer constituting the negative electrode of the Example 3-2 was 1.63 g/cm$^3$ (not including foil).

Fabrication of Negative Electrode of Example 3-3

A negative electrode of Example 3-3 was fabricated in the same manner as in the Comparative Example 3-1, except that, in the Comparative Example 3-1, the rotational speed at the time of dispersing was changed from 2000 rpm to 1500 rpm while the dispersing (mixing under stirring) time at the time of fabricating the negative electrode active material (water-based) slurry was maintained to 4 minutes. Further, the density of the negative electrode active material layer constituting the negative electrode of the Example 3-3 was 1.63 g/cm$^3$ (not including foil).

Fabrication of Negative Electrode of Example 3-4

A negative electrode of Example 3-4 was fabricated in the same manner as in the Comparative Example 3-1, except that, in the Comparative Example 3-1, the dispersing (mixing under stirring) time at the time of fabricating the negative electrode active material (water-based) slurry was changed from 4 minutes to 6 minutes and the rotational speed at the time of dispersing was changed from 2000 rpm to 1000 rpm. Further, the density of the negative electrode active material layer constituting the negative electrode of the Example 3-4 was 1.63 g/cm$^3$ (not including foil).

Fabrication of Negative Electrode of Example 3-5

A negative electrode of Example 3-5 was fabricated in the same manner as in the Comparative Example 3-1, except that, in the Comparative Example 3-1, the dispersing (mixing under stirring) time at the time of fabricating the negative electrode active material (water-based) slurry was changed from 4 minutes to 2 minutes and the rotational speed at the time of dispersing was changed from 2000 rpm to 1500 rpm. Further, the density of the negative electrode active material layer constituting the negative electrode of the Example 3-5 was 1.63 g/cm$^3$ (not including foil).

Fabrication of Negative Electrode of Example 3-6

A negative electrode of Example 3-6 was fabricated in the same manner as in the Comparative Example 3-1, except that, in the Comparative Example 3-1, the dispersing (mixing under stirring) time at the time of fabricating the negative electrode active material (water-based) slurry was changed from 4 minutes to 2 minutes and the rotational speed at the time of dispersing was changed from 2000 rpm to 1000 rpm. Further, the density of the negative electrode active material layer constituting the negative electrode of the Example 3-6 was 1.63 g/cm³ (not including foil).

Fabrication of Negative Electrode of Comparative Example 3-6

A negative electrode of Comparative Example 3-6 was fabricated in the same manner as in the Comparative Example 3-1, except that, in the Comparative Example 3-1, the dispersing (mixing under stirring) time at the time of fabricating the negative electrode active material (water-based) slurry was changed from 4 minutes to 1 minute and the rotational speed at the time of dispersing was changed from 2000 rpm to 1000 rpm. Further, the density of the negative electrode active material layer constituting the negative electrode of the Comparative Example 3-6 was 1.63 g/cm³ (not including foil).

Fabrication of Negative Electrode of Comparative Example 3-7

A negative electrode of Comparative Example 3-7 was fabricated in the same manner as in the Comparative Example 3-6. Further, the density of the negative electrode active material layer constituting the negative electrode of the Comparative Example 3-7 was 1.63 g/cm³ (not including foil).

3. Fabrication of Battery 3.1. Small-Sized Battery (Comparative Examples 1-1 to 1-3 and 1-6, Comparative Examples 2-1 to 2-3 and 2-7, and Comparative Examples 3-1 to 3-3 and 3-7)

The positive electrode obtained in the above section 1 and the negative electrode obtained in the above section 2 were cut to have an active material layer area (length 2.5 cm×width 2.0 cm) and laminated through a porous polypropylene separator (thickness: 25 μm, porosity: 55%) (one sheet of the positive electrode and two sheets of the negative electrode), thereby fabricating a power generating element. The positive electrode lead and the negative electrode lead were joined to respective current collectors of the obtained power generating element, respectively, and the positive electrode lead or the negative electrode lead was joined to the positive electrode current collecting plate or the negative electrode current collecting plate. Thereafter, the power generating element was introduced into an aluminum laminate sheet bag as the battery outer casing material (length 3.7 cm×width 3.2 cm) such that the positive electrode current collecting plate and the negative electrode current collecting plate were exposed to the outside of the battery, the electrolyte solution was injected from an opening portion by an injecting machine. The aluminum laminate sheet bag is the one obtained by overlapping two aluminum laminate sheets (film sheets obtained by sandwiching aluminum by PP films), sealing three sides of four sides of the outer peripheral (outer edge) by thermocompression bonding, and unsealing the remaining one side (opening portion). Further, as the electrolyte solution, one obtained by adding 1 part by mass of vinylene carbonate as an additive with respect to 100 parts by weight of a solution obtained by dissolving 1.0 M LiPF$_6$ in a mixed solvent of ethylene carbonate (EC) and diethyl carbonate (DEC) (volume ratio of EC:DEC=3:7) was used. Herein, the amount of the electrolyte solution injected was set to an amount 1.50 times with respect to the total pore volume (obtained by calculation) of the positive electrode active material layer, the negative electrode active material layer, and the separator. Then, under vacuum condition, the opening portion of the aluminum laminate sheet bag was sealed such that the positive electrode current collecting plate and the negative electrode current collecting plate connected to both the electrodes (current collectors) through the leads were exposed, and then a testing cell as a laminate type lithium ion secondary battery was completed.

3.2. Fabrication of Large-Sized Battery (Comparative Examples 1-4 and 1-5, Comparative Examples 2-4 to 2-6, Examples 2-1 to 2-6, Comparative Examples 3-4 to 3-6, and Examples 3-1 to 3-6)

The positive electrode obtained in the above section 1 and the negative electrode obtained in the above section 2 were cut to have an active material layer area (length 25 cm×width 15 cm) and laminated through a porous polypropylene separator (thickness: 25 μm, porosity: 55%) (10 sheets of the positive electrode and 11 sheets of the negative electrode), thereby fabricating a power generating element. The positive electrode lead and the negative electrode lead were joined to respective current collectors of the obtained power generating element, respectively, and the positive electrode lead or the negative electrode lead was joined to the positive electrode current collecting plate or the negative electrode current collecting plate. Thereafter, the power generating element was introduced into an aluminum laminate sheet bag as the battery outer casing material (length 27.4 cm×width 17.4 cm) such that the positive electrode current collecting plate and the negative electrode current collecting plate were exposed to the outside of the battery, the electrolyte solution was injected. The aluminum laminate sheet bag is the one obtained by sandwiching two rectangular aluminum laminate sheets, sealing three sides of four sides of the outer peripheral (outer edge) by thermocompression bonding, and unsealing the remaining one side (opening portion). Further, as the electrolyte solution, one obtained by adding 1 part by mass of vinylene carbonate as an additive with respect to 100 parts by weight of a solution obtained by dissolving 1.0 M LiPF$_6$ in a mixed solvent of ethylene carbonate (EC) and diethyl carbonate (DEC) (volume ratio of EC:DEC=3:7) was used. Herein, the amount of the electrolyte solution injected was set to an amount 1.50 times with respect to the total pore volume (obtained by calculation) of the positive electrode active material layer, the negative electrode active material layer, and the separator. Then, under vacuum condition, the opening portion of the aluminum laminate sheet bag was sealed such that the positive electrode current collecting plate and the negative electrode current collecting plate connected to both the electrodes (current collectors) through the leads were exposed, and then a testing cell as a laminate type lithium ion secondary battery was completed.

4. Evaluation of Battery 4.1. Evaluation of Battery Characteristics

Each battery (testing cell) obtained above was subjected to a charge and discharge test under the following condition to measure a rated capacity and to measure a battery volume, and the cycle durability was evaluated.

4.2. Measurement of Rated Capacity

The rated capacity of the battery (testing cell) was obtained as follows.

An electrolyte solution was injected to a battery (testing cell), and then maintained for about 10 hours. Thereafter, the rated capacity was measured by the following procedures 1 to 5 at a temperature 25° C. and in a voltage range of 3.0 V to 4.15 V.

Procedure 1: After the voltage reached 4.15 V at a constant current charge of 0.1 C, rested for 5 minutes.

Procedure 2: Following the procedure 1, charged for 1.5 hours at a constant voltage charge, and rested for 5 minutes.

Procedure 3: After the voltage reached 3.0 V by a constant current discharge of 0.1 C, discharged for 2 hours at a constant voltage discharge, and then rested for 10 seconds.

Procedure 4: After the voltage reached 4.1 V by a constant current charge of 0.1 C, charged for 2.5 hours at a constant voltage charge, and then rested for 10 seconds.

Procedure 5: After the voltage reached 3.0 V by a constant current discharge of 0.1 C, discharged for 2 hours at a constant voltage discharge, and then stopped for 10 seconds.

Rated capacity: Discharge capacity in discharge from constant current discharge to constant voltage discharge (CCCV discharge capacity) in the procedure 5 was regarded as the rated capacity. The obtained results are presented in the section "Cell capacity" of the following Tables 1 to 3.

4.3. Measurement of Battery Volume

The battery (testing cell) volume was obtained from the product of the projected area and the thickness of the battery including the battery outer casing body. Of them, regarding the projected area of the battery including the battery outer casing body, six projected areas of the front surface, the rear surface, the right lateral surface, the left lateral surface, the planar surface, and the bottom surface of the battery are obtained, but it is sufficient to use the largest projected area of the battery of these projected areas. In the present Examples, the projected area of the bottom surface of the battery when the battery is placed on a flat plate in the most stable state was used. In addition, the thickness of the battery including the battery outer casing body was the thickness at the time of full charge, and in the present Examples, procedures up to the Procedure 4 were performed similarly to the section "4.2. Measurement of Rated Capacity" and the thickness of the battery (testing cell) after constant voltage charge of the Procedure 4 was measured. In addition, since the thickness of the battery including the battery outer casing body is a large area in the case of a large-sized battery, in consideration of a variation caused by measurement sites, in the present Examples, thicknesses of the battery including the battery outer casing body at nine sites of sites indicated by number symbols 1 to 9 illustrated in FIG. 2 or in the vicinity thereof were measured and a value obtained by averaging the thicknesses was used. The thickness of a small-sized battery was similarly measured. The obtained results are presented in the section "Cell volume" of the following Tables 1 to 3.

Further, the ratio value of the battery volume (the product of the projected area and the thickness of the battery including a battery outer casing body) to the rated capacity calculated from the measurement result of the rated capacity and the measurement result of the battery volume is presented in the section "Ratio of battery volume to rated capacity" of the following Tables 1 to 3.

4.4. Evaluation of Cycle Durability

In the evaluation of cycle durability, using each battery (testing cell) obtained by 3. Fabrication of Battery described above, 100 cycles of charge and discharge at a rate of 1 C were repeated at 25° C. In the evaluation of the battery, as a charge condition, a constant current constant voltage charging method was performed until the maximum voltage became 4.2 V at a rate of 0.5 C and then the current value became 0.01 C. Further, as a discharge condition, a constant current discharge method for discharging a battery until the minimum voltage became 3.0 V at a rate of 0.5 C was performed. Any test was performed under ordinary temperature and ordinary pressure (25° C., under atmospheric pressure). The ratio of the discharge capacity at the 100th cycle to the discharge capacity at the 1st cycle was regarded as "capacity retention rate (%)" and evaluated. The obtained results are presented in the section "100 cyc capacity retention rate (%)" of the following Tables 1 to 3.

Figure 6:
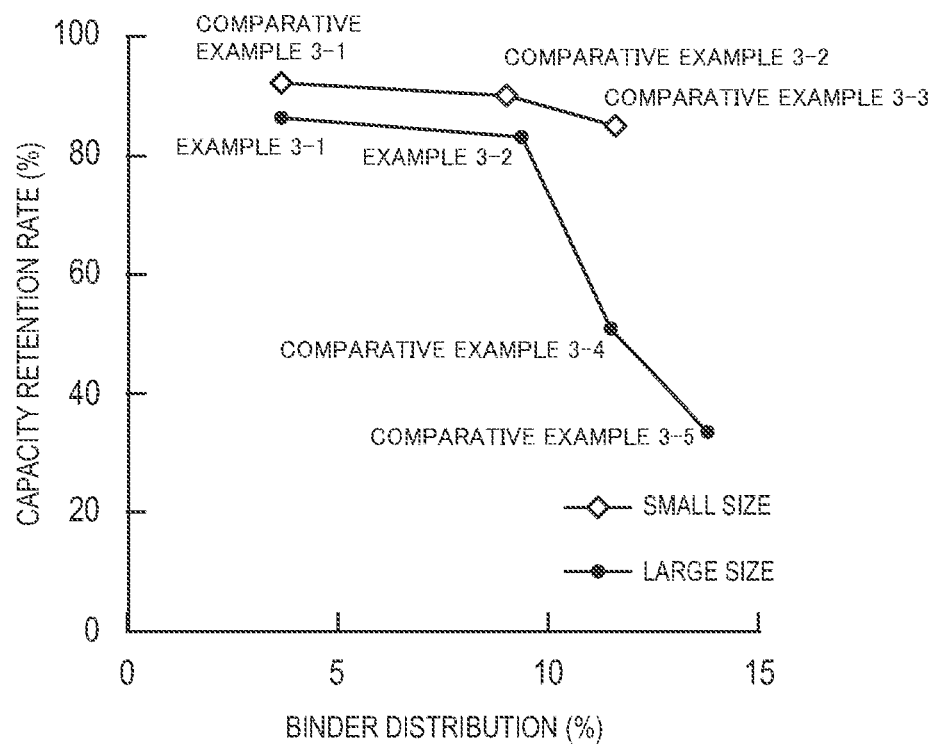
FIG. 6 is a diagram illustrating a relation between binder distribution and a capacity retention rate while batteries are divided into a small-sized battery and a large-sized battery in Examples 3-1 and 3-2 and Comparative Examples 3-1 to 3-5 (a mixing ratio of a Si material is 20% by mass).

Further, the relation between the binder distribution (%) and the capacity retention rate (%) is presented in FIGS. 4 to 6. Of them, FIG. 4 is a diagram in which the Comparative Examples 1-1 to 1-5 (pore distribution: 5.7% or less) of Table 1 having a mixing ratio of the Si material of 0% by mass were divided into small-sized batteries (Comparative Examples 1-1 to 1-3) and large-sized batteries (Comparative Examples 1-4 and 1-5) and then plotted. FIG. 5 is a diagram in which the Comparative Examples 2-1 to 2-5 and the Examples 2-1 and 2-2 (pore distribution: 6.1% or less) of Table 2 having a mixing ratio of the Si material of 10% by mass were divided into small-sized batteries (Comparative Examples 2-1 to 2-3) and large-sized batteries (Examples 2-1 and 2-2 and Comparative Examples 2-4 and 2-5) and then plotted. FIG. 6 is a diagram in which the Comparative Examples 3-1 to 3-5 and the Examples 3-1 and 3-2 (pore distribution: 6.1% or less) of Table 3 having a mixing ratio of the Si material of 20% by mass were divided into small-sized batteries (Comparative Example 3-1 to 3-3) and large-sized batteries (Examples 3-1 and 3-2 and Comparative Examples 3-4 and 3-5) and then plotted.

[Mathematical Formula 4]

Capacity retention rate (%)=Discharge capacity at the 100th cycle/Discharge capacity at the 1st cycle×100

TABLE 1

| | Mixing ratio of Si material % by mass | Cell capacity Ah | Cell volume $cm^3$ | Ratio of battery volume to rated capacity $cm^3$/Ah | Binder distribution % | Pore distribution % | Capacity retention rate % |
|---|---|---|---|---|---|---|---|
| Comparative Example 1-1 | 0 | 0.028 | 0.74 | 26.43 | 2.8 | 5.3 | 95.7 |
| Comparative Example 1-2 | 0 | 0.027 | 0.74 | 27.41 | 8.7 | 5.7 | 94.2 |
| Comparative Example 1-3 | 0 | 0.027 | 0.73 | 27.04 | 11.2 | 5.2 | 93.5 |
| Comparative Example 1-4 | 0 | 21.12 | 170.22 | 8.06 | 8.7 | 5.0 | 93.3 |
| Comparative Example 1-5 | 0 | 21.02 | 170.25 | 8.10 | 11.2 | 4.6 | 91.1 |
| Comparative Example 1-6 | 0 | 0.027 | 0.72 | 26.67 | 3.3 | 6.1 | 90.9 |

TABLE 2

| | Mixing ratio of Si material % by mass | Cell capacity Ah | Cell volume cm³ | Ratio of battery volume to rated capacity cm³/Ah | Binder distribution % | Pore distribution % | Capacity retention rate % |
|---|---|---|---|---|---|---|---|
| Comparative Example 2-1 | 10 | 0.027 | 0.72 | 26.67 | 3.3 | 5.2 | 94.9 |
| Comparative Example 2-2 | 10 | 0.027 | 0.72 | 26.67 | 9 | 4.9 | 93.3 |
| Comparative Example 2-3 | 10 | 0.026 | 0.72 | 27.69 | 11.1 | 4.2 | 92.2 |
| Comparative Example 2-4 | 10 | 21.09 | 158.86 | 7.53 | 11.1 | 6.1 | 57.4 |
| Comparative Example 2-5 | 10 | 21.02 | 159.77 | 7.60 | 13 | 5.8 | 37.8 |
| Example 2-1 | 10 | 21.07 | 159.81 | 7.58 | 3.3 | 5.2 | 91.1 |
| Example 2-2 | 10 | 21.02 | 159.82 | 7.60 | 9.4 | 5.3 | 90.9 |
| Example 2-3 | 10 | 21.03 | 159.86 | 7.60 | 3.3 | 8.4 | 89.3 |
| Example 2-4 | 10 | 20.99 | 159.87 | 7.62 | 3.2 | 11.6 | 77.4 |
| Example 2-5 | 10 | 20.98 | 158.99 | 7.58 | 9.4 | 8.5 | 89.9 |
| Example 2-6 | 10 | 20.97 | 159.02 | 7.58 | 9.4 | 13.2 | 76.5 |
| Comparative Example 2-6 | 10 | 19.12 | 158.67 | 8.30 | 11.3 | 12.4 | 52.2 |
| Comparative Example 2-7 | 10 | 0.026 | 0.72 | 27.69 | 11.3 | 12.4 | 86.6 |

TABLE 3

| | Mixing ratio of Si material % by mass | Cell capacity Ah | Cell volume cm³ | Ratio of battery volume to rated capacity cm³/Ah | Binder distribution % | Pore distribution % | Capacity retention rate % |
|---|---|---|---|---|---|---|---|
| Comparative Example 3-1 | 20 | 0.026 | 0.70 | 26.92 | 3.6 | 5.3 | 92.1 |
| Comparative Example 3-2 | 20 | 0.026 | 0.70 | 26.92 | 9 | 4.7 | 90.1 |
| Comparative Example 3-3 | 20 | 0.025 | 0.69 | 27.60 | 11.5 | 4.8 | 85.3 |
| Comparative Example 3-4 | 20 | 20.71 | 152.28 | 7.35 | 11.5 | 4.6 | 50.8 |
| Comparative Example 3-5 | 20 | 20.66 | 152.29 | 7.37 | 13.8 | 6.1 | 33.5 |
| Example 3-1 | 20 | 21.02 | 151.88 | 7.23 | 3.6 | 5.0 | 86.3 |
| Example 3-2 | 20 | 20.89 | 152.10 | 7.28 | 9.4 | 5.3 | 83.5 |
| Example 3-3 | 20 | 21.04 | 152.25 | 7.24 | 3.5 | 8.9 | 84.5 |
| Example 3-4 | 20 | 20.98 | 152.24 | 7.26 | 3.6 | 11.5 | 74.3 |
| Example 3-5 | 20 | 20.87 | 151.98 | 7.28 | 9.4 | 8.2 | 81.1 |
| Example 3-6 | 20 | 20.78 | 151.92 | 7.31 | 9.4 | 12.7 | 72.1 |
| Comparative Example 3-6 | 20 | 20.68 | 151.88 | 7.34 | 11.6 | 13.1 | 33.1 |
| Comparative Example 3-7 | 20 | 0.024 | 0.69 | 28.75 | 11.6 | 13.1 | 81.6 |

From the results of Table 1 and FIG. 4, in a case where the negative electrode in which the negative electrode active material was only graphite (carbon material) was used, the capacity retention rate was high, that is, about 90% regardless of small-sized batteries (Comparative Examples 1-1 to 1-3 and 1-6) having a small electrode area or large-sized batteries (Comparative Examples 1-4 and 1-5) having a large electrode area and regardless of the binder distribution and the pore distribution. However, since a high capacity of the Si material is not used in the negative electrode active material, a high-capacity battery cannot be obtained (regarding this point, as described in the background art, there is a problem in that a theoretical charge and discharge capacity of 372 mAh/g or more, which is obtained from $LiC_6$ as a compound introduced with the maximum amount of lithium, cannot be obtained).

Meanwhile, from the results of Table 2 and FIG. 5, it was possible to confirm that the battery using the negative electrode in which the Si-based material ratio (mixing ratio of the Si material) in the active material was 10% by mass exhibited a high capacity retention rate of 85% or more regardless of the variation in dispersity of SBR (binder distribution) and the pore distribution in the small-sized battery having a small electrode area (see Comparative Examples 2-1 to 2-3 and 2-7).

However, in the case of the large-sized battery having a large electrode area, when the variation in dispersity of SBR (binder distribution) was more than 10%, a decrease in capacity retention rate was observed (see Comparative Examples 2-4 to 2-6). On the other hand, when the variation in dispersity of SBR (binder distribution) was set in a predetermined range (within 10%), even in the case of the large-sized battery having a large electrode area, a significant improvement in capacity retention rate (durability) was confirmed (see Examples 2-1 to 2-6). In addition to the binder distribution, when the variation in dispersity of pores (pore distribution) was also set in a predetermined range (within 10%), a more significant improvement in capacity retention rate (durability) could be confirmed (see Examples 2-1 to 2-3 and 2-5). In a case where the binder distribution and the pore distribution were out of the above range (more than 10%), in the small-sized battery (Comparative Example 2-7), a significant decrease (degradation) in capacity retention rate (durability) was not confirmed, but in the large-sized battery (Comparative Example 2-6), a significant decrease (degradation) in capacity retention rate (durability) was confirmed.

From the results of Tables 2 and 3 and FIGS. 5 and 6, in the battery using the negative electrode in which the Si-based material ratio (mixing ratio of the Si material) in the active material was 20% by mass, as compared with the battery using the negative electrode in which the Si-based material ratio in the active material was 10% by mass, a decrease in durability was observed as whole, but the same tendency as in the case of the Si-based material ratio of 10% by mass was exhibited. On the other hand, as compared with the Examples 2-1 to 2-6, there was an advantage that a higher-capacity battery is obtained. According to this, it is possible to achieve further higher capacity of the battery while high cycle durability is maintained without decreasing cycle durability of the battery much (Examples 3-1 to 3-6). On the other hand, in the battery using the negative electrode in which the Si-based material ratio in the active material was 10% by mass, as compared with the Examples 3-1 to 3-6, there was an advantage that the battery was excellent in durability. According to this, it is possible to achieve further improvement in cycle durability of the battery while a high capacity is maintained without decreasing the capacity of the battery much (Examples 2-1 to 2-6).

That is, it was possible to confirm that the battery exhibits a high capacity retention rate of 80% or more regardless of the variation in dispersity of SBR (binder distribution) and the pore distribution in the small-sized battery having a small electrode area in the battery using the negative electrode in which the Si-based material ratio in the active material was 20% by mass (see Comparative Examples 3-1 to 3-3 and 3-7).

However, in the case of the large-sized battery having a large electrode area, when the variation in dispersity of SBR (binder distribution) was more than 10%, a decrease in capacity retention rate was observed (see Comparative Examples 3-4 to 3-6). On the other hand, when the variation in dispersity of SBR (binder distribution) was set in a predetermined range (within 10%), a significant improvement in capacity retention rate (durability) was confirmed even in the case of the large-sized battery having a large electrode area (see Examples 3-1 to 3-6). In addition to the binder distribution, when the variation in dispersity of pores (pore distribution) was also set in a predetermined range (within 10%), a more significant improvement in capacity retention rate (durability) could be confirmed (see Examples 3-1 to 3-3 and 3-5). In a case where the binder distribution and the pore distribution were out of the above range (more than 10%), in the small-sized battery (Comparative Example 3-7), a significant decrease (degradation) in capacity retention rate (durability) was not confirmed, but in the large-sized battery (Comparative Example 3-6), a significant decrease (degradation) in capacity retention rate (durability) was confirmed.

From the above description, it is found that, in the large-sized battery which concurrently use the Si material and the carbon material and has a large capacity and a large area electrode (the rated capacity is 3 Ah or more and the ratio value of the battery volume to the rated capacity is 10 $cm^3$/Ah or less), the working effect of the present invention is obtained by setting the binder distribution within 10%. That is, with the above-described configuration, degradation is suppressed which is caused by occurrence of the phenomenon that non-uniformity of reactivity with Li ions caused by a local increase in interelectrode distance between the positive electrode and the negative electrode and a local decrease in interelectrode distance therebetween. As a result, it is considered that the cycle durability of the battery is improved while a high capacity is maintained. In addition to the above description, it is considered that since degradation caused by the phenomenon is further suppressed by setting the pore distribution within 10%, the cycle durability of the battery is improved while a high capacity is maintained.

In the small-sized batteries of the Comparative Examples in which the Si material and the carbon material were used concurrently, the rated capacity is less than 3 Ah, and the ratio value of the battery volume to the rated capacity is more than 10 $cm^3$/Ah, it is found that the battery performance is not dependent on a certain specific parameter (binder distribution, and further, pore distribution) (there is no problem to be solved) (see Tables 1 to 3 and FIGS. 4 to 6). On the other hand, in the large-sized batteries of the present Examples, the parameter (binder distribution, and further, pore distribution) was absolutely necessary for solving a problem (new problem) peculiar to the large-sized batteries, and it was possible to confirm the critical meaning of the parameter from the Examples and the Comparative Examples on the basis of Tables 2 and 3 and FIGS. 5 and 6 described above.

REFERENCE SIGNS LIST

10, 50 Lithium ion secondary battery
11 Negative electrode current collector
12 Positive electrode current collector
13 Negative electrode active material layer
15 Positive electrode active material layer
17 Electrolyte layer (separator)
19 Single battery layer
21, 57 Power generating element
25 Negative electrode current collecting plate
27 Positive electrode current collecting plate
29, 52 Battery outer casing material
58 Positive electrode tab
59 Negative electrode tab

The invention claimed is:
1. A non-aqueous electrolyte secondary battery which has a ratio value of a battery volume, defined as a product of a projected area and a thickness of the battery including a battery outer casing body, to a rated capacity of 10 $cm^3$/Ah or less and a rated capacity of 3 Ah or more, the battery comprising:
a power generating element including
a positive electrode comprising a positive electrode active material layer containing a positive electrode active material formed on a surface of a positive electrode current collector,
a negative electrode comprising a negative electrode active material layer containing a negative electrode active material formed on a surface of a negative electrode current collector, and a separator, wherein the negative electrode active material layer comprises a negative electrode active material represented by the following Formula (1)

$$\alpha(\text{Si material}) + \beta(\text{carbon material}) \quad (1)$$

wherein the Si material is a Si-containing alloy; the carbon material is one or two or more kinds selected from the group consisting of graphite, non-graphitizable carbon, and amorphous carbon, $\alpha$ and $\beta$ represent % by mass of each component in the negative electrode active material layer; and $80 \leq \alpha + \beta \leq 98$, $0.1 \leq \alpha \leq 40$, and $58 \leq \beta \leq 97.9$ are satisfied, and a difference between the maximum value and the minimum value of an area proportion (%) of a binder in an area of a field of view of each image of cross-sections of the negative electrode active material layer in a case where a plurality of arbitrary places is selected in a plane of the negative electrode active material layer is within 10%.

2. The non-aqueous electrolyte secondary battery according to claim 1, wherein the binder contained in the negative electrode active material layer comprises at least styrene-butadiene rubber.

3. The non-aqueous electrolyte secondary battery according to claim 1, wherein a difference between the maximum value and the minimum value of an area proportion (%) of pores in each image of cross-sections of the negative electrode active material layer in a case where a plurality of arbitrary places is selected in a plane of the negative electrode active material layer is within 10%.

4. The non-aqueous electrolyte secondary battery according to claim 1, wherein the positive electrode active material comprises a lithium nickel-based composite oxide represented by the General Formula (1): $\text{Li}_a\text{Ni}_b\text{Mn}_c\text{Co}_d\text{M}_x\text{O}_2$, wherein (provided that, a, b, c, d, and x satisfy $0.9 \leq a \leq 1.2$, $0 < b < 1$, $0 < c \leq 0.5$, $0 < d \leq 0.5$, $0 \leq x \leq 0.3$, and $b+c+d=1$; and M represents at least one kind selected from the group consisting of Ti, Zr, Nb, W, P, Al, Mg, V, Ca, Sr, and Cr.

5. The non-aqueous electrolyte secondary battery according to claim 1, wherein a shape of the electrode is a rectangular shape, and an aspect ratio of the electrode defined as a length/width ratio of the rectangular electrode active material layer is 1 to 3.

6. The non-aqueous electrolyte secondary battery according to claim 1, wherein the separator is a separator in which a heat resistant insulating layer is laminated on a porous substrate.

7. The non-aqueous electrolyte secondary battery according to claim 1, wherein the battery is a flat stack type laminate battery having a configuration in which the power generating element is sealed in a battery outer casing body formed of a laminate film containing aluminum.

* * * * *